(12) United States Patent
Karaki et al.

(10) Patent No.: US 10,308,890 B2
(45) Date of Patent: Jun. 4, 2019

(54) THERMOSETTING RESIN COMPOSITION, SLIDING MEMBER AND METHOD FOR PRODUCING SLIDING MEMBER

(71) Applicant: MINEBEA MITSUMI INC., Kitasaku-gun, Nagano (JP)

(72) Inventors: Tadahiko Karaki, Tomi (JP); Aya Kakegawa, Saku (JP); Koichiro Sagiyama, Chiba (JP)

(73) Assignee: MINEBEA MITSUMI INC., Nagano (JP)

( * ) Notice: Subject to any disclaimer, the term of this patent is extended or adjusted under 35 U.S.C. 154(b) by 511 days.

(21) Appl. No.: 15/009,083

(22) Filed: Jan. 28, 2016

(65) Prior Publication Data

US 2016/0145527 A1    May 26, 2016

Related U.S. Application Data

(63) Continuation of application No. PCT/JP2014/070256, filed on Jul. 31, 2014.

(30) Foreign Application Priority Data

Jul. 31, 2013   (JP) ................................ 2013-159976

(51) Int. Cl.
C10M 133/42 (2006.01)
C08G 18/58 (2006.01)
(Continued)

(52) U.S. Cl.
CPC ........... C10M 133/42 (2013.01); C08G 18/58 (2013.01); C08G 59/3236 (2013.01);
(Continued)

(58) Field of Classification Search
CPC ........... C10M 133/42; C10M 169/044; C10M 133/44; C10M 169/04; C10M 133/24;
(Continued)

(56) References Cited

U.S. PATENT DOCUMENTS 6,180,574 B1   1/2001 Ryan et al.
2007/0223850 A1   9/2007 Lopes et al.
(Continued)

FOREIGN PATENT DOCUMENTS

EP   2 842 970 A1   3/2015
JP   H04-55457 A   2/1992
(Continued)

OTHER PUBLICATIONS

Oct. 28, 2014 International Search Report issued in International Patent Application No. PCT/JP2014/070256.
(Continued)

*Primary Examiner* — Taiwo Oladapo
(74) *Attorney, Agent, or Firm* — Pearne & Gordon LLP

(57) ABSTRACT

There is provided a thermosetting resin composition including: an epoxy compound having an isocyanuric acid ring represented by the following formula (1); a solid lubricant; and a dicyanate compound, or the dicyanate compound and a bismaleimide compound.

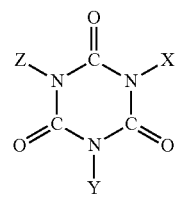

(1)

18 Claims, 4 Drawing Sheets

(51) Int. Cl.
  *C08L 63/06*   (2006.01)
  *F16C 33/20*   (2006.01)
  *C09J 175/04*   (2006.01)
  *C10M 107/38*   (2006.01)
  *C10M 133/24*   (2006.01)
  *C10M 133/44*   (2006.01)
  *C10M 145/20*   (2006.01)
  *C10M 169/04*   (2006.01)
  *C08G 59/32*   (2006.01)
  *C08G 59/40*   (2006.01)
  *C09D 163/06*   (2006.01)
  *C08K 5/20*   (2006.01)
  *C08K 5/3492*   (2006.01)
  *C08L 27/18*   (2006.01)
  *C08L 71/00*   (2006.01)
  *F16C 33/10*   (2006.01)
  *C08G 101/00*   (2006.01)

(52) U.S. Cl.
  CPC ..... *C08G 59/4028* (2013.01); *C08G 59/4042* (2013.01); *C08K 5/20* (2013.01); *C08K 5/3492* (2013.01); *C08L 27/18* (2013.01); *C08L 63/06* (2013.01); *C08L 71/00* (2013.01); *C09D 163/06* (2013.01); *C09J 175/04* (2013.01); *C10M 107/38* (2013.01); *C10M 133/24* (2013.01); *C10M 133/44* (2013.01); *C10M 145/20* (2013.01); *C10M 169/04* (2013.01); *C10M 169/044* (2013.01); *F16C 33/201* (2013.01); *C08G 2101/00* (2013.01); *C08G 2650/40* (2013.01); *F16C 33/1095* (2013.01); *F16C 2208/86* (2013.01); *F16C 2220/70* (2013.01)

(58) Field of Classification Search
  CPC .............. C10M 107/38; C10M 145/20; C08K 5/3492; C08K 5/20; C09D 163/06; C09J 175/04; C08L 63/06; C08L 71/00; C08L 27/18; C08G 2650/40; C08G 2101/00; C08G 59/3236; C08G 59/4028; C08G 59/4042; C08G 18/58; F16C 2208/86; F16C 2220/70; F16C 33/1095; F16C 33/201
  See application file for complete search history.

(56) References Cited

U.S. PATENT DOCUMENTS

2011/0262059 A1 10/2011 Karaki et al.
2014/0169713 A1  6/2014 Karaki et al.

FOREIGN PATENT DOCUMENTS

JP  2007-255712 A  10/2007
JP  2010-100803 A   5/2010
JP  2011-247408 A  12/2011

OTHER PUBLICATIONS

Oct. 28, 2014 Written Opinion of the International Searching Authority issued in International Patent Application No. PCT/JP2014/070256.
Feb. 8, 2017 Extended European Search Report issued in European Patent Application No. 14832721.6.
Sep. 6, 2016 Office Action issued in Japanese Patent Application No. 2015-529623.

THERMOSETTING RESIN COMPOSITION, SLIDING MEMBER AND METHOD FOR PRODUCING SLIDING MEMBER

CROSS REFERENCE TO RELATED APPLICATION

This application is a Continuation Application of International Application No. PCT/JP2014/070256 which was filed on Jul. 31, 2014 claiming the conventional priority of Japanese patent Application No. 2013-159976 filed on Jul. 31, 2013.

BACKGROUND OF THE INVENTION

Field of the Invention

The present invention relates to a thermosetting (thermocurable) resin composition for forming a self-lubricating liner of a sliding member such as an unlubricated sliding bearing and a reamer bolt, a sliding member provided with the self-lubricating liner, and a method for producing the sliding member.

Description of the Related Art

A sliding bearing in which a shaft of rotary motion or translational motion is held by a sliding surface has been widely used. In particular, an unlubricated sliding bearing using no lubricating oil for a sliding surface has been used for applications requiring low friction coefficient, high durability, high load capacity, high heat resistance, high oil resistance, and the like, such as vessel or ship application and aircraft application.

As such an unlubricated sliding bearing, Patent Literature 1 (Japanese Patent Application Laid-open No. 2007-255712 corresponding to United States Patent Application Publication No. 2007/223850) discloses a spherical bearing for high-load application including an outer race member having a concave first bearing surface and an inner race member having a convex second bearing surface slidably movable relative to the first bearing surface. In the spherical bearing, one of the outer race member and the inner race member is made of titanium alloy which has a bearing surface made of titanium nitride and formed on the titanium alloy surface by a physical vapor deposition method (PVD). The bearing surface of the other member includes a self-lubricating liner made from resin. The self-lubricating liner is composed of a fabric including fibers of polytetrafluoroethylene (PTFE) and polyaramid. The fabric is saturated with a phenol resin composition.

Patent Literature 2 (U.S. Pat. No. 6,180,574) discloses a self-lubricating coating composed of a thermosetting acrylic composition in which dipentaerythritol pentaacrylate is contained in an amount of 20% by weight or more and a solid lubricant such as polytetrafluoroethylene is contained in an amount of 10% by weight or more with respect to the entire amount of the thermosetting acrylic composition. Patent Literature 2 discloses that 20% by weight or more of triethylene glycol dimethacrylate and 1% by weight or less of aramid pulp may be added to the self-lubricating coating. Patent Literature 2 also discloses a sleeve bearing in which the self-lubricating coating is applied, as a liner, on the inner circumferential surface of an outer race.

Patent Literature 3 (Japanese Patent Application Laid-open No. 2011-247408 corresponding to United States Patent Application Publications No. 2011/262059 and No. 2014/169713) by the applicant of the present application discloses a sliding bearing suitable for the aircraft application and the like. The sliding bearing includes a self-lubricating liner formed on a sliding surface of the sliding bearing, and the self-lubricating liner is composed of a self-lubricating resin composition obtained by mixing 60% by weight to 80% by weight of polyether ketone resin, 10% by weight to 30% by weight of PTFE, 5% by weight to 15% by weight of carbon fiber, and 15% by weight or less of aramid fiber. The total content amount of the carbon fiber and the aramid fiber is 10% by weight to 25% by weight in the self-lubricating resin composition. A metal surface on which the self-lubricating liner is formed has a surface roughness Ra (average centerline roughness) of 4.0 μm or more and an Rmax (maximum height) of 30.0 μm or more.

Since the unlubricated sliding bearings disclosed in Patent Literatures 1 to 3 are used by being incorporated into an aircraft and the like, the unlubricated sliding bearings are required to have low friction coefficient, high load capacity, heat resistance, oil resistance, and the like as described above. Further, from the side of manufacturers of airframe structure of the aircraft and the like, there is such a demand that in a step of assembling a sliding bearing such as a sleeve bearing into the body structure, the manufactures wish to perform fitting adjustment of the sliding bearing through cutting or grinding of a sliding surface of the sliding bearing instead of performing a size adjustment on the side of a shaft.

However, in the case of the fibrous lubricating liner described in Patent Literature 1, it is not possible to perform the size adjustment through the grinding or the cutting because, if it is subjected to such an after-processing, the fibers of the lubricating liner will be cut and the lubricating liner will not function as a liner any longer.

On the other hand, the self-lubricating coating based on thermosetting acrylic resin and described in Patent Literature 2 has wear resistance and friction coefficient under a high temperature which are not sufficient to be used by being incorporated into the aircraft and the like. There is a demand for a self-lubricating coating having further higher wear resistance and further lower friction coefficient under a high temperature. Further, when the size adjustment is performed through grinding or cutting of the sliding surface of the sliding bearing, it is preferable that the thickness of the self-lubricating coating is thick so that the size adjustment can be performed in a wide range. However, in such a case that a thermosetting acrylic resin subjected to a relatively large thermal contraction (thermal shrinkage) during the thermo-curing process is used to form a thick self-lubricating coating, it is possible to occur a film separation, a film cracking or the like.

The self-lubricating liner described in Patent Literature 3 is based on the polyether ketone resin which is thermoplastic resin, and thus the self-lubricating liner can be produced by an injection molding method achieving high productivity. However, in order to improve the adhesion of the liner to the inner circumferential surface of the outer race, it is required that a shot blasting process for increasing the surface roughness of the inner circumferential surface of the outer race be performed beforehand. Further, in a case that PTFE is blended as a solid lubricant with the thermoplastic resin such as the polyether ketone resin, PTFE is required to be blended in an amount of less than 30% by weight with respect to the entire amount of the thermoplastic resin, due to the following reason. During the kneading of resin and the injection molding, PTFE generates decomposition gas because it is heated to above its melting point by being exposed to high temperature and high pressure. From the viewpoint of safety, the generation of such decomposition gas should be prevented. Accordingly, the addition amount of PTFE should be limited. On the other hand, in order to improve the lubricating property of the liner, it is desirable that the addition amount of PTFE be increased.

Under the above circumstances, there is a demand for a resin composition for a self-lubricating liner which can safely ensure a sufficient addition amount of PTFE, and for which a process for roughening the base surface is not indispensable.

The present teaching has been conceived to solve the foregoing problems. An object of the present teaching is to provide a resin composition for forming a self-lubricating liner which has low friction coefficient, high durability, high load capacity, high heat resistance and high oil resistance, as well as which can be subjected to a size adjustment through grinding or cutting after being cured, and for which a process for roughening the base surface is not indispensable. Another object of the present teaching is to provide a sliding member with the self-lubricating liner composed of the resin composition.

SUMMARY OF THE INVENTION

According to a first aspect related to the present teaching, there is provided a thermosetting resin composition including:

an epoxy compound having an isocyanuric acid ring represented by the following formula (1):

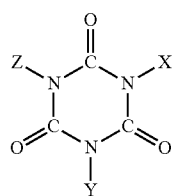

(1)

in the formula (1), at least one of X, Y and Z is a group containing an epoxy ring, and when X, Y or Z contains no epoxy ring, X, Y or Z containing no epoxy ring is an atom of H, a group composed only of C and H, or a group composed only of C, H and O;

a solid lubricant; and a dicyanate compound, or the dicyanate compound and a bismaleimide compound;

wherein the solid lubricant is contained in an amount of 10% by weight to 70% by weight in the thermosetting resin composition;

a total content amount (L+M) of a content amount (L) of the epoxy compound having the isocyanuric acid ring and a content amount (M) of the dicyanate compound, or a total content amount (L+M+N) of the content amount (L) of the epoxy compound having the isocyanuric acid ring, the content amount (M) of the dicyanate compound, and a content amount (N) of the bismaleimide compound is in a range of 20% by weight to 90% by weight; and a weight ratio (M/L) of the content amount (M) of the dicyanate compound to the content amount (L) of the epoxy compound having the isocyanuric acid ring, or a weight ratio ((M+N)/L) of a total of the content amount (M) of the dicyanate compound and the content amount (N) of the bismaleimide compound to the content amount (L) of the epoxy compound having the isocyanuric acid ring is in a range of 0.65 to 4.00.

In this aspect, in a case that thermosetting resin composition contains only the dicyanate compound among the dicyanate compound and the bismaleimide compound, namely, in a case that the thermosetting resin compound does not contain the bismaleimide compound, the total content amount (L+M) of the content amount (L) of the epoxy compound having the isocyanuric acid ring and the content amount (M) of the dicyanate compound may be in the range of 20% by weight to 90% by weight, and the weight ratio (M/L) of the content amount (M) of the dicyanate compound to the content amount (L) of the epoxy compound having the isocyanuric acid ring may be in the range of (M/L)=0.65 to 4.00.

Further, in this aspect, in a case that the thermosetting resin composition contains both of the dicyanate compound and the bismaleimide compound, the total content amount (L+M+N) of the content amount (L) of the epoxy compound having the isocyanuric acid ring, the content amount (M) of the dicyanate compound and the content amount (N) of the bismaleimide compound may be in the range of (L+M+N) =20% by weight to 90% by weight; and the weight ratio ((M+N)/L) of the total of the content amount (M) of the dicyanate compound and the content amount (N) of the bismaleimide compound to the content amount (L) of the epoxy compound having the isocyanuric acid ring may be in the range of ((M+N)/L)=0.65 to 4.00.

In this aspect, the solid lubricant preferably contains polytetrafluoroethylene resin. Further, the epoxy compound having the isocyanuric acid ring preferably may contain an epoxy compound in which all of the X, Y and Z in the formula (1) are each the group containing the epoxy ring, an epoxy compound in which two of the X, Y and Z in the formula (1) are each the group containing the epoxy ring, and an epoxy compound in which one of the X, Y and Z in the formula (1) is the group containing the epoxy ring.

The epoxy compound having the isocyanuric acid ring contains may be 1,3,5-tris(2,3-epoxypropyl)-1,3,5-triazine-2,4,6(1H, 3H, 5H)-trione, and/or may be an addition reaction product of the 1,3,5-tris(2,3-epoxypropyl)-1,3,5-triazine-2,4,6(1H, 3H, 5H)-trione and propionic acid anhydride. Further, the epoxy compound having the isocyanuric acid ring may contain both of: the 1,3,5-tris(2,3-epoxypropyl)-1,3,5-triazine-2,4,6(1H, 3H, 5H)-trione; and the addition reaction product of the 1,3,5-tris(2,3-epoxypropyl)-1,3,5-triazine-2,4,6(1H, 3H, 5H)-trione and the propionic acid anhydride.

In this aspect, the dicyanate compound may be an aromatic dicyanate compound. Further, the dicyanate compound may be a compound represented by the following formula (6):

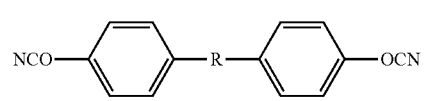

(6)

in the formula (6), R is a substituted or unsubstituted alkylene group.

Furthermore, the dicyanate compound may be 2,2-bis(4-cyanatophenyl)propane.

The thermosetting resin composition may contain the dicyanate compound and the bismaleimide compound; and the dicyanate compound and the bismaleimide compound may react with each other to form a bismaleimide triazine resin. The bismaleimide compound may be an aromatic bismaleimide compound. Further, the bismaleimide compound may be 4,4-bismaleimide diphenylmethane.

The thermosetting resin composition may further contain a thermoplastic resin. The thermoplastic resin may be polyether ether ketone.

According to a second aspect related to the present teaching, there is provided a sliding member including: a sliding surface; and a self-lubricating liner formed on the sliding surface by the thermosetting resin composition related to the first aspect.

The sliding member may be a sliding bearing. Further, the sliding bearing may be a spherical bearing. Furthermore, the sliding member may include a head portion, a shaft portion, and a thread portion; wherein the self-lubricating liner may be formed on an outer circumferential surface of the shaft portion.

According to a third aspect related to the present teaching, there is provided a method for producing a sliding member, the method including: applying a thermosetting resin composition on a sliding surface of a body of the sliding member; and curing the thermosetting resin composition applied on the sliding surface to form a self-lubricating resin layer, wherein the thermosetting resin composition contains:

an epoxy compound having an isocyanuric acid ring represented by the following formula (1):

(1)

in the formula (1), at least one of X, Y and Z is a group containing an epoxy ring, and when X, Y or Z contains no epoxy ring, X, Y or Z containing no epoxy ring is an atom of H, a group composed only of C and H, a group composed only of C, H and O;

a solid lubricant;

a dicyanate compound, or the dicyanate compound and a bismaleimide compound.

In this aspect, the thermosetting resin composition may contain, for example, polytetrafluoroethylene resin in an amount of 10% by weight to 70% by weight in the thermosetting resin composition. Further, in a case that a total content amount (L+M) of a content amount (L) of the epoxy compound having the isocyanuric acid ring and a content amount (M) of the dicyanate compound, or a total content amount (L+M+N) of the content amount (L) of the epoxy compound having the isocyanuric acid ring, the content amount (M) of the dicyanate compound and a content amount (N) of the bismaleimide compound is in a range of 20% by weight to 90% by weight, and a weight ratio (M/L) of the content amount (M) of the dicyanate compound to the content amount (L) of the epoxy compound having the isocyanuric acid ring, or a weight ratio ((M+N)/L) of a total of the content amount (M) of the dicyanate compound and the content amount (N) of the bismaleimide compound to the content amount (L) of the epoxy compound having the isocyanuric acid ring may be in a range of 0.65 to 4.00.

The method for producing the sliding member of this aspect may further include cutting or grinding the self-lubricating resin layer so that the self-lubricating resin layer has a desired size.

DESCRIPTION OF THE PREFERRED EMBODIMENTS

Figure 1A:
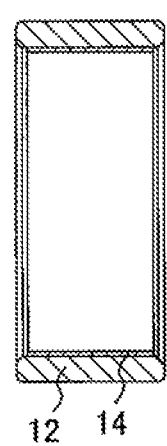
FIG. 1A is a longitudinal sectional view of a sleeve bearing related to the present teaching cut along an axial direction of the shaft of the sleeve bearing.

In the following, an explanation will be made about a thermosetting resin composition related to the present teaching and a sliding member provided with a self-lubricating liner made from the thermosetting resin composition.

<Sliding Member>

At first, an exemplary sliding member including the self-lubricating liner made from the thermosetting resin composition related to the present teaching will be explained while referring to FIGS. 1A and 1B. A sleeve bearing 10 shown in FIGS. 1A and 1B includes a cylindrical outer race member (body) 12 which is made of metal such as bearing steel, stainless steel, duralumin material, titanium alloy and the like, and a self-lubricating liner layer 14 which is formed on the inner circumferential surface (sliding surface) of the outer race member 12. The self-lubricating liner layer 14 is a resin layer having a self-lubricating property, and is formed by applying the thermosetting resin composition related to the present teaching, which will be described below, on the inner circumferential surface of the outer race member 12 and then curing the applied thermosetting resin composition. The size adjustment of the self-lubricating liner can be easily performed by grinding and/or cutting. Accordingly, in this sense, the self-lubricating liner is also referred to as a "machinable liner (processable liner)" as appropriate. Note that the sliding member is not particularly limited provided that the sliding member has a sliding surface at least a portion or part thereof. Accordingly, the sliding member includes not only a sleeve bearing used for rotary motion or translational (linear) motion but also various sliding members such as a spherical bearing and a reamer bolt which will be described later. These sliding members are also included in an object of the present teaching.

<Thermosetting Resin Composition>

The thermosetting resin composition contains, as a component mainly composing the resin, an epoxy compound having an isocyanuric acid ring represented by the following formula (1):

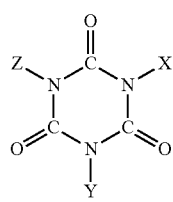
(1)

In the formula (1), at least one of X, Y and Z is a group containing an epoxy ring, and when X, Y or Z contains no epoxy ring, X, Y or Z containing no epoxy ring is an atom of H, a group composed only of C and H, or a group composed only of C, H and O. The epoxy compound having the isocyanuric acid ring represented by the formula (1) is an epoxy compound wherein all of the X, Y and Z in the formula (1) are each the group containing the epoxy ring, an epoxy compound wherein two of the X, Y and Z in the formula (1) are each the group containing the epoxy ring, or an epoxy compound wherein one of the X, Y and Z in the formula (1) is the group containing the epoxy ring.

In the compound wherein all of the X, Y and Z in the formula (1) are each the group containing the epoxy ring, the X, Y and Z are not particularly limited provided that each of the X, Y and Z is the group containing the epoxy ring. However, the X, Y and Z are each preferably a group containing the epoxy ring and composed only of H, C and O. For example, each of the X, Y and Z may be an epoxy group; an alkyl group substituted by the epoxy group, such as a glycidyl group; or an aryl group substituted by the epoxy group. Further, the X, Y and Z may be groups which are same with one another, or mutually different groups. The epoxy compound having the isocyanuric acid ring is preferably a compound applicable to a sliding surface and capable of forming a self-lubricating liner which hardly wears after being cured. From such a viewpoint, the group containing the epoxy ring is preferably the glycidyl group. An epoxy compound in which all the X, Y and Z in the formula (1) are each the glycidyl group is 1,3,5-tris(2,3-epoxypropyl)-1,3,5-triazine-2,4,6(1H, 3H, 5H)-trione, represented by the following formula (2) (also known under a different name of: trisepoxy propyl isocyanurate; tris(2,3-epoxypropyl) isocyanurate, hereinafter referred to as "TEPIC" (trademark), as appropriate).

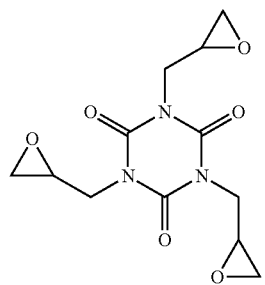
(2)

In the compound wherein two of the X, Y and Z in the formula (1) are each the group containing the epoxy ring, each of the two groups containing the epoxy ring is not particularly limited provided that each of the two groups contains the epoxy ring, in a similar manner as the compound wherein all of the X, Y and Z in the formula (1) are each the group containing the epoxy ring. However, each of the two groups containing the epoxy ring is preferably a group containing the epoxy ring and composed only of H, C and O, and more preferably a glycidyl group.

In the formula (1), X, Y or Z containing no epoxy ring is an atom of H, a group composed only of C and H, or a group composed only of C, H and O. The group composed only of C and H, and the group composed only of C, H and O can be exemplified by a substituted or unsubstituted alkyl group, a substituted or unsubstituted aryl group, and the like. From the viewpoint of forming the self-lubricating liner, the X, Y or Z not containing the epoxy ring is preferably a unsubstituted alkyl group, or is preferably a group composed only of C, H and O having an acrylic acid ester structure, or a group composed only of C, H and O having a methacrylic acid ester structure.

The compound wherein two of the X, Y and Z in the formula (1) are each the group containing the epoxy ring can be exemplified by: 1-methyl-3,5-bis-oxiranyl methyl-[1,3,5] triazine-2,4,6-trione represented by the following formula (3); acrylic acid 2-(3,5-bis-oxiranyl methyl-2,4,6-trioxo-[1,3,5] triazine-1-yl)ethyl ester represented by the following formula (4); and 2-methyl-acrylic acid 2-(3,5-bis-oxiranyl methyl-2,4,6-trioxo-[1,3,5] triazine-1-yl)ethyl ester represented by the following formula (5).

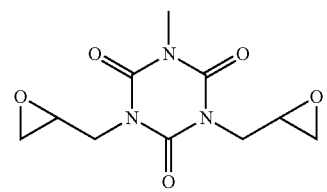
(3)

The compound represented by the formula (3) is an epoxy compound in which two of the X, Y and Z in the formula (1) are each a glycidyl group, and a remaining one is a methyl group.

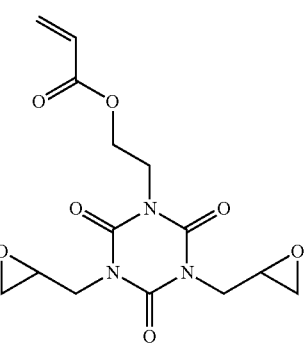
(4)

The compound represented by the formula (4) is an epoxy compound in which two of the X, Y and Z in the formula (1) are each a glycidyl group, and a remaining one has an acrylic acid ester structure.

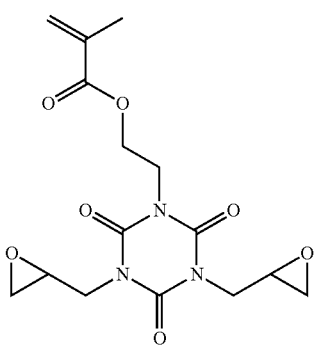

(5)

The compound represented by the formula (5) is an epoxy compound in which two of the X, Y and Z in the formula (1) are each a glycidyl group, and the remaining one has a methacrylic acid ester structure.

In the compound wherein one of the X, Y and Z in the formula (1) is the group containing the epoxy ring, the group containing the epoxy ring is not particularly limited provided that the group contains the epoxy ring, in a similar manner as the compound describe above wherein all of the X, Y and Z in the formula (1) are each the group containing the epoxy ring. However, the group containing the epoxy ring is preferably a group containing the epoxy ring and composed only of H, C and O, and more preferably a glycidyl group.

In the compound wherein only one of the X, Y and Z in the formula (1) is the group containing the epoxy ring, X, Y or Z containing no epoxy ring is a group composed only of C and H, a group composed only of C, H and O, or an atom of H, in a similar manner as the compound wherein two of the X, Y and Z in the formula (1) are each the group containing the epoxy ring.

In the epoxy compound having the isocyanuric acid ring related to the present teaching may use the three kinds of compounds, namely, the compound wherein all of the X, Y and Z in the formula (1) are each the group containing the epoxy ring, the compound wherein two of the X, Y and Z in the formula (1) are each the group containing the epoxy ring, and the compound wherein one of the X, Y and Z in the formula (1) is the group containing the epoxy ring, either singly or as a mixture of two kinds of or three kinds (all) of these three compounds by mixing the compounds at any mixing ratio. For example, as the epoxy compound having the isocyanuric acid ring, it is allowable to use an addition reaction product of the compound wherein all of the X, Y and Z in the formula (1) are each the group containing the epoxy ring, and acid anhydride. By subjecting the epoxy ring and the acid anhydride to addition reaction, the epoxy ring is opened, thereby making it possible to eliminate the epoxy ring from one group of, or two groups of the X, Y and Z. Therefore, the addition reaction product of the compound wherein all of the X, Y and Z in the formula (1) are each the group containing the epoxy ring and the acid anhydride is a mixture of the compound wherein two of the X, Y and Z in the formula (1) are each the group containing the epoxy ring and the compound wherein one of the X, Y and Z in the formula (1) is the group containing the epoxy ring. For example, the mixture can be exemplified by an addition reaction product of TEPIC (trademark) represented by the formula (2) as described above and propionic acid anhydride. Further, as the epoxy compound having the isocyanuric acid ring related to the present teaching, it is possible to use a mixture of TEPIC (trademark) and the addition reaction product of TEPIC (trademark) and the propionic acid anhydride. The mixture of TEPIC (trademark) and the addition reaction product of TEPIC (trademark) and the propionic acid anhydride is a mixture of the epoxy compound wherein all of the X, Y and Z in the formula (1) are each the group containing the epoxy ring, the epoxy compound wherein two of the X, Y and Z in the formula (1) are each the group containing the epoxy ring, and the epoxy compound wherein one of the X, Y and Z in the formula (1) is the group containing the epoxy ring. In the mixture of TEPIC (trademark) and the addition reaction product of TEPIC (trademark) and the propionic acid anhydride, the weight ratio between the TEPIC (trademark) and the addition reaction product of TEPIC (trademark) and the propionic acid anhydride may be, for example, in a range of (TEPIC):(the addition reaction product of TEPIC (trademark) and the propionic acid anhydride)=43:57 to 63:37.

The epoxy compound having the isocyanuric acid ring represented by the formula (1) has quite excellent heat resistance in addition to having the thermosetting (thermocurable) property, and thus is suitable for a self-lubricating liner of a sliding member, and the like. In particular, for a compound to be used as the sliding member incorporated in an aircraft, the compound is required to have a heat resistance of 163 degrees Celsius or more. In this regard, the epoxy compound having the isocyanuric acid ring is also suitable for such an application. Further, since the epoxy compound having the isocyanuric acid ring has a small thermal compression during the thermo-curing, any film separation and/or any film cracking can be suppressed during the thermal curing, which in turn makes it possible to obtain a cured product with a great thickness. Since the cured product with a large thickness can be obtained, in a case of performing the size adjustment of a machinable liner through cutting and/or grinding, it is possible to set a wide range for the size adjustment.

The content amount of the epoxy compound having the isocyanuric acid ring in the thermosetting resin composition is preferably in a range of 5% by weight to 60% by weight. In a case that the content amount of the epoxy compound having the isocyanuric acid ring in the thermosetting resin composition is less than 5% by weight, the fluidity of the resin may become insufficient and that the application of the epoxy compound may become difficult. Also, the strength of the liner may become insufficient. On the other hand, in a case that the content amount of the epoxy compound having the isocyanuric acid ring in the thermosetting resin composition exceeds 60% by weight, the content amount of a solid lubricant (as will be described later on) becomes small, and the lubricating property is lowered.

The thermosetting resin composition related to the present teaching further contains a dicyanate compound, or a mixture of the dicyanate compound and a bismaleimide compound. Although the dicyanate compound is not particularly limited provided that the dicyanate compound is a compound having two cyanate groups in the molecule, the dicyanate compound is preferably an aromatic dicyanate compound having an aromatic ring in the molecule, from the viewpoint of mechanical strength and heat resistance. For example, a compound represented by the following formula (6) can be used. In the formula (6), R is a substituted or unsubstituted alkylene group.

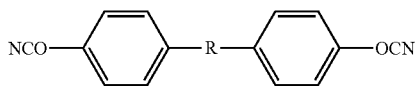

(6)

The compound represented by the formula (6) can be exemplified by 2,2-bis(4-cyanatophenyl)propane (also known under a different name of: bisphenol A dicyanate) represented by the following formula (7).

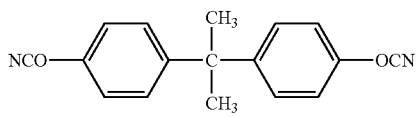

(7)

In a case that the resin composition is heated, the dicyanate compound is trimerized to form a triazine structure (isocyanuric acid ring), thereby becoming a triazine resin. Further, the triazine resin co-polymerizes and cross-links also with the above-described epoxy compound having the isocyanuric acid ring, thereby forming a cured product. Namely, the dicyanate compound functions in a manner similar to that of a curing agent which thermally cures the epoxy compound having the isocyanuric acid ring. Accordingly, the resin composition related to the present teaching does not need to contain any curing agent, despite that the resin composition contains the epoxy compound. The cured product of the epoxy compound having the isocyanuric acid ring and the dicyanate compound is a cured product having a high cross-linking density with an excellent wear resistance, and has a high heat resistance of 300 degrees Celsius or more.

The thermosetting resin composition related to the present teaching may use a mixture of the dicyanate compound and the bismaleimide compound, rather than using the dicyanate compound. As the dicyanate compound used in the mixture, it is possible to use a substance similar to the above-described dicyanate compound. Although the bismaleimide compound is not particularly limited provided that the bismaleimide compound is a compound having two maleimide structures, it is possible to use, for example, a compound represented by the following formula (8). In the formula (8), R is a substituted or unsubstituted alkylene group, or a substituted or unsubstituted aryl group.

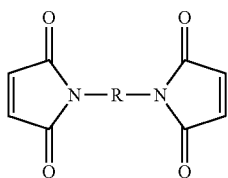

(8)

Further, the bismaleimide compound is preferably an aromatic bismaleimide compound having an aromatic ring in the molecule, from the viewpoint of mechanical strength and heat resistance. For example, the bismaleimide compound may be a compound wherein the R in the above formula (8) is a substituted or unsubstituted aryl group. The aromatic bismaleimide compound can be exemplified, for example, by 4,4-bismaleimide diphenylmethane represented by the following formula (9).

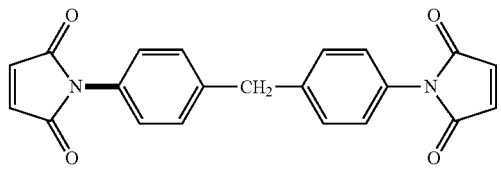

(9)

In a case that a resin composition containing the mixture of the dicyanate compound and the bismaleimide compound is heated, the triazine resin is formed by the dicyanate compound, as described above. Further, since the bismaleimide compound has a terminal-unsaturated double bond structure forming a ladder structure with a triazine ring of the triazine resin, the bismaleimide compound is heated to thereby form a complex cross-linking with the triazine resin, forming a bismaleimide-triazine resin (hereinafter referred to as "BT resin" as appropriate) having an interpenetrating polymer network (IPN) in which the molecules of the bismaleimide compound and the triazine resin are entangled with each other. Furthermore, the BT resin crosslinks also with the epoxy compound having the isocyanuric acid ring to thereby form the cured product. In such a manner, similarly to the dicyanate compound, the BT resin also functions in a manner similar to that of the curing agent which thermally cures the epoxy compound having the isocyanuric acid ring. Accordingly, the cured product of the epoxy compound having the isocyanuric acid ring and the BT resin is a cured product having a high cross-linking density with an excellent wear resistance similarly to the above-described cured product of the epoxy compound having the isocyanuric acid ring and the dicyanate compound, and has a high heat resistance of 300 degrees Celsius or more.

The content amount of the dicyanate compound, or the content amount of the mixture of the dicyanate compound and the bismaleimide compound in the thermosetting resin composition may be, for example, in a range of 10% by weight to 50% by weight.

A weight ratio (M:L) between the dicyanate compound (M) and the epoxy compound having the isocyanuric acid ring (L) is in a range of (M:L)=65:100 to 400:100, or a weight ratio ((M+N):L) between a total of the dicyanate compound (M) and the bismaleimide compound (N), and the epoxy compound having the isocyanuric acid ring (L) is in a range of ((M+N):L)=65:100 to 400:100. Namely, in the resin composition, the weight ratio (M/L) of the content amount (M) of the dicyanate compound to the content amount (L) of the epoxy compound having the isocyanuric acid ring is in a range of 0.65 to 4.00, or a weight ratio ((M+N)/L) of a total of the content amount (M) of the dicyanate compound and the content amount (N) of the bismaleimide compound to the content amount (L) of the epoxy compound having the isocyanuric acid ring is in a range of 0.65 to 4.00. In a case that the above-described weight ratio is less than 0.65, any incomplete curing of the resin occurs, and the heat resistance and strength of the resin are lowered; in another case that the above-described weight ratio exceeds 4.00, the curing speed is extremely lowered.

Further, in the mixture of the dicyanate compound and the bismaleimide compound, the weight ratio between the dicyanate compound (M) and the bismaleimide compound (N) may be, for example, in a range of (dicyanate compound (M)):(bismaleimide compound (N))=90:10 to 95:5.

The total content amount (L+M) of the content amount (L) of the epoxy compound having the isocyanuric acid ring and the content amount (M) of the dicyanate compound in the thermosetting resin composition is in a range of (L+M)=20% by weight to 90% by weight; or a total content amount (L+M+N) of the content amount (L) of the epoxy compound having the isocyanuric acid ring, the content amount (M) of the dicyanate compound, and the content amount (N) of the bismaleimide compound in the thermosetting resin composition is in a range of (L+M+N)=20% by weight to 90% by weight. In a case that the above-described total content amount (L+M) or (L+M+N) is less than 20% by weight, the mechanical strength of the resin may be lowered; in another case that the above-described total content amount (L+M) or (L+M+N) exceeds 90% by weight, the wear resistance of the resin may be lowered.

The resin composition related to the present teaching contains a solid lubricant. The resin composition related to the present teaching contains polytetrafluoroethylene resin (hereinafter abbreviated as "PTFE"), as the solid lubricant, preferably in an amount of 10% by weight to 70% by weight in the resin composition, and more preferably in an amount of 30% by weight to 60% by weight in the resin composition. It is allowable to use any form of PTFE, such as powdery PTFE, fibrous PTFE, and the like, either singly or in combination thereof. It is allowable to perform a surface treatment for the particles or fibers of the powdery PTFE or fibrous PTFE wherein the surface of the particles or fibers is etched by sodium-naphthalene and then covered by an epoxy-modified acrylate. By performing such a surface treatment, the affinity of PTFE with the epoxy resin made from the epoxy compound having the isocyanuric acid ring is enhanced, thereby realizing more firm bonding of PTFE with the epoxy resin. Therefore, when using the resin composition related to the present teaching as a self-lubricating liner, it is possible to suppress any separation or detaching of the particles and fibers of PTFE from the self-lubricating liner during the sliding movement, thereby making it possible to reduce a wear amount (abrasion loss) of the self-lubricating liner.

The average particle diameter or fiber length of PTFE is preferably within a range of 75 μm to 180 μm. By doing so, even when the blending amount of PTFE is increased, PTFE hardly aggregates, which in turn increase the area ratio of PTFE present in the surface after the curing and allows PTFE to be distributed uniformly. In a case that the average particle diameter or fiber length of PTFE is less than 75 μm, PTFE easily aggregates when the resin having viscosity is being kneaded, which in turn hinders any uniform distribution of PTFE on the surface of the resin after the curing. Further, in a case that the average particle diameter or fiber length of PTFE is outside the range of 75 μm to 180 μm, the wear amount of the self-lubricating liner becomes relatively large.

In the present teaching, a solid lubricant other than PTFE can be used. For example, the resin composition related to the present teaching may contain graphite, melamine cyanurate, or the like. By using melamine cyanurate together with PTFE, the friction coefficient of the resin composition after being cured can be lowered further than in a case of using PTFE singly. In such a case, melamine cyanurate is preferably contained in an amount of 30% by weight or less in the resin composition. In a case that the content amount of melamine cyanurate exceeds 30% by weight, although the friction coefficient of the self-lubricating liner is lowered, the wear amount tends to be increased. Melamine cyanurate has a structure in which melamine molecules and cyanuric acid molecules each having a six-membered ring structure are bonded by the hydrogen bond, and are arranged in a planar form. The planes of the bonded melamine molecules and cyanuric acid molecules are overlapped with each other in a layered (laminated) form by a weak bonding, thereby forming a cleavage slip structure such as that of molybdenum disulfide ($MoS_2$), graphite or the like. Such a structure is considered as contributing to the solid lubricating property.

By using melamine cyanurate together with PTFE, it is possible to lower the friction coefficient of the obtained self-lubricating liner further than in a case of using PTFE singly as the solid lubricant. In particular, it has been found out that, by making the total of the content amount of PTFE and the content amount of melamine cyanurate within a range of 30% by weight to 45% by weight, the friction coefficient of the self-lubricating liner could be lowered approximately by 10% as compared with the case of using PTFE singly.

Further, the thermosetting resin composition related to the present teaching may contain a thermoplastic resin, in addition to the solid lubricant, in order to obtain satisfactory sliding property and toughness. In particular, a particulate thermo-plastic resin has effects of imparting the sliding property to a cured product of the thermosetting resin composition and thereby lowering the friction coefficient thereof. Furthermore, the particulate thermoplastic resin has the wear resistance as well. Accordingly, in a case that the blending amount of the solid lubricant is great, the solid lubricant and the particulate thermoplastic resin can be used together to thereby improve the sliding property while suppressing any lowering in the mechanical strength of the cured product. As the particulate thermoplastic resin, it is possible to use, for example, a crystalline resin such as polyether ether ketone (hereinafter referred to as "PEEK" as appropriate) of which average particle diameter (D50) is in a range of 20 μm to 50 μm, nylon 6 (PA6) of which average particle diameter (D50) is in a range of 5 μm to 10 μm, nylon 12 (PA12) of which average particle diameter (D50) is in a range of 13 μm to 20 μm, and the like. In particular, a cured product obtained from a thermosetting resin composition using PTFE and PEEK in combination has a coefficient of linear expansion smaller than in a cured product obtained from a thermosetting resin composition containing only PTFE. Accordingly, in a case of forming, from the thermosetting resin composition using PTFE and PEEK in combination, the self-lubricating liner layer 14 on the inner circumferential surface of the outer race member 12 as shown in FIGS. 1A and 1B described above, the internal stress in the self-lubricating liner layer 14 accompanying with the thermal expansion or thermal compression of the metallic outer race 12 is lowered, and thus the size change amount of the self-lubricating liner layer 14 can be suppressed.

From the viewpoint of improving the sliding property and toughness of the cured product of the thermosetting resin composition, the particulate thermoplastic resin is preferably contained in an amount of 30% by weight or less in the thermosetting resin composition. Further, PEEK has effects of raising the glass transition point of the cured product of the resin composition and to improve the heat resistance of the cured product. From the viewpoint of improving the heat resistance of the cured product of the resin composition, PEEK is preferably contained in an amount of 10% by weight to 30% by weight in the thermosetting resin composition.

The resin composition related to the present teaching may be added with glass fiber, for the purpose of improving the strength of the self-lubricating liner. As the glass fiber, it is possible to use a circular cross-sectional glass fiber having a circular cross section, or irregular shape (non-circular) cross-sectional glass fiber having a non-circular cross section. Note that the resin composition related to the present teaching may contain an inorganic fiber such as carbon fiber, aramid fiber, potassium titanate whisker, and the like, as reinforcing fiber, in addition to the glass fiber.

The resin composition related to the present teaching may further contain phosphate. The phosphate is capable of improving the initial conformability when using the resin composition as the self-lubricating liner, and of stabilizing the friction coefficient quicker than in a case that the phosphate is not blended in the resin composition. The phosphate is preferably contained in an amount of 5% by weight or less in the resin composition. The phosphate can be phosphate of alkali metal or alkali earth metal exemplified by: tertiary phosphate, secondary phosphate, pyrophosphate, phosphite, or metaphosphate. Specifically, the phosphate can be exemplified by: trilithium phosphate, lithium dihydrogen phosphate, dibasic sodium phosphate, lithium pyrophosphate, tricalcium phosphate, calcium monohydrogen phosphate, calcium pyrophosphate, lithium metaphosphate, magnesium metaphosphate, calcium metaphosphate, and the like.

The resin composition related to the present teaching may contain fumed silica. The fumed silica is used to impart the thixotropy to the resin composition. In a case that a resin composition with any insufficient thixotropy is applied on the sliding surface, such a resin composition drops off from the sliding surface as drips, which in turn makes the formation of the liner be difficult. Accordingly, the fumed silica can be added to thereby adjust the thixotropy. The fumed silica is preferably added in an amount of 5% by weight or less with respect to the entire amount of the resin composition. In a case that the blending amount of the fumed silica exceeds 5% by weight, the wear amount of the liner is increased, which is not desired.

The thermosetting resin composition related to the present teaching may further contain a diluent so as to lower the viscosity of the resin composition so that the resin composition can be easily applied on the sliding surface. The diluent is preferably a reactive diluent such as: 1,2-epoxy-3-(tolyloxy) propane, alkyl glycidyl ether, phenyl glycidyl ether, cresyl glycidyl ether, n-butyl glycidyl ether, versatic acid glycidyl ether, styrene oxide, ethylhexyl glycidyl ether, butyl phenyl glycidyl ether, 1,6-hexandiol diglycidyl ether, neopentyl glycol diglycidyl ether, diethylene glycol diglycidyl ether, trimethylolpropane triglycidyl ether. In order that the properties of the thermosetting resin composition related to the present teaching (such as the sliding performance, heat-resistance, processability, and the like) are not adversely affected, the weight ratio of the diluent to the epoxy compound having the isocyanuric acid ring, namely, the weight ratio: (diluent)/(epoxy compound having the isocyanuric acid ring) is preferably 0.65 or less.

The resin composition related to the present teaching is preferably in a liquid form at room temperature. With this, the resin composition can be easily applied on the sliding surface of the sliding member, and can be cured by being heated after the application. In a case that the resin composition is used for the aircraft application, the glass transition point $T_g$ of the resin composition related to the present teaching is preferably 150 degrees Celsius or more, due to the following two reasons, namely: the heat resistance required by AS81934 standard (to be descried later on) needs to be satisfied; and the heat resistance same as or greater than that of the resin liner based on polyether ketone disclosed in Patent Literature 3 (Japanese Patent Application Laid-open No. 2011-247408) is desired to be secured.

Since the resin composition related to the present teaching uses a liquid thermosetting resin as the base for the resin, the solid lubricant containing PTFE can be easily mixed, and PTFE, or PTFE together with particulate thermoplastic resin, can be added in a high blending amount in the range of 10% by weight to 70% by weight that could not been added in the case of using the thermoplastic resin as the base resin. Accordingly, it is possible to produce a self-lubricating liner with a lower friction coefficient and with less wear.

The present teaching also provides a manufacturing method for producing a sliding member formed with a self-lubricating liner by: applying, on a sliding surface of a body of the sliding member, a thermosetting resin composition containing an epoxy compound having the isocyanuric acid ring represented by the above-described formula (1), and the dicyanate compound, or the mixture of the dicyanate compound and the bismaleimide compound; and curing the applied thermosetting resin composition by heating the applied thermosetting resin composition so as to form the self-lubricating liner. The self-lubricating liner becomes a machinable liner which can be subjected to an after-processing through cutting and/or grinding so that the self-lubricating liner can have a desired size.

The sliding member related to the present teaching may be a spherical bearing provided with an outer race member having a concave first bearing surface and an inner race member having a convex second bearing surface slidably movable on the first bearing surface. In a case of manufacturing such a spherical bearing, at first, the thermosetting resin composition according to the present teaching is applied on the first bearing surface or the second bearing surface as the sliding surfaces. Subsequently, the thermosetting resin composition applied on the first or second bearing surface is heated to be primarily cured. Afterwards, the inner race member is inserted in the outer race member and the outer race member is pressed to be plastically deformed so as to follow the convex surface of the inner race member. Then, the thermosetting resin composition is heated to be secondarily cured. Accordingly, the self-lubricating liner can be formed.

As described above, the thermosetting resin composition related to the present teaching can be applied on the sliding surface and then cured by heating. During the curing, any high temperature and high pressure conditions are not required, unlike in a case of using a thermoplastic resin. Accordingly, there is no such a concern, for example, that polytetrafluoroethylene resin is heated to the melting point or more of the polytetrafluoroethylene resin while being exposed to high pressure and thereby causes the polytetrafluoroethylene resin to generate any decomposition gas, and thus a relatively large amount of polytetrafluoroethylene resin as the solid lubricant can be blended safely to the thermosetting resin composition. Further, since the cured resin composition adheres quite firmly to the surface (base surface) to which is applied, it is also possible to eliminate the process for previously roughening the base surface. Obviously, when a higher adhesive hardness is required, it is allowable to roughen the base surface and then to apply the thermosetting resin composition related to the present teaching on the base surface and to cure the applied thermosetting resin composition. Due to the above advantages, the safety of operation and the power saving performance can be improved, and the equipment cost also can be reduced. Furthermore, since the cured resin composition can be easily cut and/or ground, it is possible to provide a machinable liner for which an after-processing such as size adjustment can be performed. According to the method for producing the sliding member related to the present teaching, it is possible to produce sliding members such as a reamer bolt, a spherical bearing, and the like having a self-lubricating liner provided on a sliding surface thereof, easily and with low cost and high precision.

EXAMPLES

A resin composition related to the present teaching and a sliding member provided with a self-lubricating liner composed of the resin composition related to the present teaching will be explained based on the following examples. However, the present teaching is not limited to the following examples.

Manufacture of Thermosetting Resin Compositions

Examples 1 to 16

There were prepared resin compositions in a liquid form of Examples 1 to 16 so that each of the liquid resin compositions of Examples 1 to 16 had the composition of resin composition as shown in TABLE 1 as follows by uniformly mixing: the epoxy resin compound having the isocyanuric acid ring represented by the above-described formula (1), and the dicyanate compound or the mixture of the dicyanate compound and the bismaleimide compound, and a solid lubricant, and further, as necessary, a diluent, a thermoplastic resin, glass fiber, dibasic sodium phosphate and fumed silica. Note that in TABLE 1, the epoxy compound is a mixture of the compound represented by the formula (2) as described above (TEPIC (trademark)) and the addition reaction product of TEPIC (trademark) and the propionic acid anhydride. Further, in TABLE 1, the dicyanate compound (DC compound) is 2,2-bis(4-cyanatophenyl) propane (also known under a different name of: bisphenol A dicyanate) represented by the above-described formula (7); and the bismaleimide compound (BMI compound) is 4,4-bismaleimide diphenylmethane represented by the above-described formula (9).

Comparative Examples 1 to 5

Comparative Examples 1 to 5 are each a resin composition composed by using the epoxy resin compound having the isocyanuric acid ring represented by the above-described formula (1), and the dicyanate compound or the mixture of the dicyanate compound and the bismaleimide compound. There were prepared resin compositions in a liquid form of Comparative Examples 1 to 5 so that each of the liquid resin compositions of Comparative Examples 1 to 5 had the composition of resin composition as shown in TABLE 2 as follows by uniformly mixing: the epoxy resin compound having the isocyanuric acid ring represented by the above-described formula (1), the dicyanate compound or the mixture of the dicyanate compound and the bismaleimide compound, and a solid lubricant, and further, as necessary, a diluent, a thermoplastic resin, glass fiber, dibasic sodium phosphate and fumed silica. Note that in TABLE 2, the epoxy compound, the dicyanate compound and the bismaleimide compound that are same as those used in Examples 1 to 16 were used also for Comparative Examples 1 to 5.

Comparative Example 6

Comparative Example 6 is a resin composition composed by using a bisphenol A type epoxy compound, rather than using the epoxy resin compound having the isocyanuric acid ring represented by the above-described formula (1), and the dicyanate compound or the mixture of the dicyanate compound and the bismaleimide compound that were used in Examples 1 to 16. A resin composition in a liquid state of Comparative Example 6 was prepared by uniformly mixing: bisphenol A diglyceride ether (DGEBA) as the bisphenol A type epoxy compound; methyltetrahydrophthalic acid anhydride (Me-THPA) as the curing agent; tetraphenyl phosphonium bromide (TPP-PB) as the cure accelerator; glass fiber (manufactured by NITTO BOSEKI CO., LTD., product name: PF80E-401, average fiber length: 80 μm×average diameter ϕ: 11 μm); polytetrafluoroethylene (PTFE) (manufactured by KITAMURA LIMITED, product name: KT-60); and fumed silica (manufactured by NIPPON AEROSIL CO., LTD., product name: AEROSIL (trademark) R805), so that Comparative Example 6 had the composition of resin composition indicated in TABLE 3 as follows.

Comparative Example 7

Comparative Example 7 is a urethane resin composition using a urethane methacrylate, rather than using the epoxy resin compound having the isocyanuric acid ring represented by the above-described formula (1), and the dicyanate compound or the mixture of the dicyanate compound and the bismaleimide compound that were used in Examples 1 to 16. A resin composition in a liquid state of Comparative Example 7 was prepared by uniformly mixing: urethane methacrylate (manufactured by HENKEL JAPAN LTD., product name: LOCTITE (trademark) 648); polytetrafluoroethylene (PTFE) (manufactured by DU PONT KABUSHIKI KAISHA, product name: MP-1300-J); molybdenum disulfide ($MoS_2$)(manufactured by DAITOU CO. LTD., product name: LM-11 Z Powder); glass fiber (manufactured by FIBERTEC, INC., product name: Microglass (trademark) 9110, average fiber length: 150 μm×average diameter ϕ: 16 μm); curing agent (manufactured by SIGMA-ALDRICH CO. LLC., benzoyl peroxide); cure accelerator (manufactured by SIGMA-ALDRICH CO. LLC., N,N-dimethylaniline); and fumed silica (manufactured by NIPPON AEROSIL CO., LTD., product name: AEROSIL (trademark) R805), so that Comparative Example 7 had the composition of resin composition indicated in TABLE 4 as follows.

Comparative Example 8

Comparative Example 8 is an acrylic resin composition using acrylate, rather than using the epoxy resin compound having the isocyanuric acid ring represented by the above-described formula (1), and the dicyanate compound or the mixture of the dicyanate compound and the bismaleimide compound that were used in Examples 1 to 16. A resin composition in a liquid state of Comparative Example 8 was prepared by uniformly mixing: dipentaerythritol pentaacrylate (manufactured by SARTOMER JAPAN KABUSHIKI KAISHA, product name: SR399); triethylene glycol dimethacrylate (manufactured by SARTOMER JAPAN KABUSHIKI KAISHA, product name: SR205); aramid fiber (manufactured by DU PONT KABUSHIKI KAISHA, product name: Kevlar (trademark) Pulp DRY, 0.8 mm); curing agent (manufactured by NORAC, INC., product name: BENOX (trademark) L-40LV); cure accelerator (manufactured by SIGMA-ALDRICH CO. LLC., 4,N,N-trimethylaniline); and fumed silica (manufactured by NIPPON AEROSIL CO., LTD., product name: AEROSIL (trademark) R805), so that Comparative Example 8 had the composition of resin composition indicated in TABLE 5 as follows.

TABLE 1

COMPOSITION OF RESIN COMPOSITIONS (% by weight)

| Examples | Epoxy Compound[1] | Mixture of DC and BMI Compound[2] | DC Compound[3] | Diluent[4] | Solid Lubricant[5] PTFE | MC | Thermoplastic resin[6] PEEK (1) | PEEK (2) | Glass Fiber[7] GF (1) | GF (2) | Dibasic sodium phosphate | Fumed Silica[8] |
|---|---|---|---|---|---|---|---|---|---|---|---|---|
| 1 | 26 | 26 | — | — | 40 | — | — | — | 7 | — | — | 1 |
| 2 | 23.65 | 23.65 | — | 4.7 | 40 | — | — | — | 7 | — | — | 1 |
| 3 | 24.5 | — | 24.5 | — | 40 | 3 | — | — | 7 | — | — | 1 |
| 4 | 24.5 | 24.5 | — | — | 40 | 3 | — | — | 7 | — | — | 1 |
| 5 | 12.5 | 12.5 | — | — | 70 | — | — | — | 4 | — | — | 1 |
| 6 | 10 | — | 39 | — | 40 | 3 | — | — | 7 | — | — | 1 |
| 7 | 52.2 | 34.8 | — | — | 10 | — | — | — | — | — | — | 3 |
| 8 | 24.5 | 24.5 | — | — | 30 | 3 | 10 | — | — | 7 | — | 1 |
| 9 | 24.5 | 24.5 | — | — | 30 | 3 | — | 10 | — | 7 | — | 1 |
| 10 | 24.5 | 24.5 | — | — | 10 | 30 | — | — | 10 | — | — | 1 |
| 11 | 20.5 | — | 20.5 | — | 40 | 3 | — | — | 15 | — | — | 1 |
| 12 | 27.5 | 27.5 | — | — | 10 | — | 30 | — | 5 | — | — | — |
| 13 | 22.5 | — | 22.5 | — | 40 | 3 | — | — | 10 | — | 1 | 1 |
| 14 | 22 | 22 | — | — | 40 | — | — | — | 10 | — | 5 | 1 |
| 15 | 29.5 | 29.5 | — | — | 30 | 3 | — | — | — | 7 | — | 1 |
| 16 | 24.5 | 24.5 | — | — | 40 | 3 | — | — | — | 7 | — | 1 |

TABLE 2

COMPOSITION OF RESIN COMPOSITIONS (% by weight)

| Comparative Examples | Epoxy Compound[1] | Mixture of DC and BMI Compound[2] | DC Compound[3] | Diluent[4] | Solid Lubricant[5] PTFE | MC | Thermoplastic resin[6] PEEK (1) | Glass Fiber[7] GF (1) | GF (2) | Dibasic sodium phosphate | Fumed Silica[8] |
|---|---|---|---|---|---|---|---|---|---|---|---|
| 1 | 35 | 20 | — | — | 35 | — | — | 9 | — | — | 1 |
| 2 | 10 | 54 | — | — | 30 | — | — | 5 | — | — | 1 |
| 3 | 9.5 | 9.5 | — | — | 40 | — | 35 | 5 | — | — | 1 |
| 4 | 9.5 | — | 9.5 | — | 80 | — | — | — | — | — | 1 |
| 5 | 42 | 42 | — | — | 5 | — | — | 10 | — | — | 1 |

Legend in Table 1 and Table 2

1): 43% by weight to 63% by weight of 1,3,5-tris(2,3-epoxypropyl)-1,3,5-triazine-2,4,6(1H, 3H, 5H)-trione (TEPIC (trademark)); and 37% by weight to 57% by weight of an addition reaction product of TEPIC (trademark) and propionic acid anhydride (manufactured by NISSAN CHEMICAL INDUSTRIES, LTD., product name: TEPIC (trademark)-PAS B26)

2) A mixture of 90% by weight to 95% by weight of DC compound: 2,2-bis(4-cyanatophenyl)propane (also known under a different name of: bisphenol A dicyanate) and 5% by weight to 10% by weight of BMI compound: 4,4-bismaleimide diphenylmethane (manufactured by MITSUBISHI GAS CHEMICAL COMPANY, INC., product name: BT2160)

3) DC compound: 2,2-bis(4-cyanatophenyl)propane (also known under a different name of: bisphenol A dicyanate) (manufactured by MITSUBISHI GAS CHEMICAL COMPANY, INC., product name: CA200)

4) Diluent: 1,2-epoxy-3-(tolyloxy) propane

5) Solid Lubricant PTFE: polytetrafluoroethylene resin (manufactured by KITAMURA LIMITED, product name: KT-60)

Solid Lubricant MC: melamine cyanurate resin (manufactured by BASF, product name: MELAPUR (trademark) MC25)

6) Thermoplastic resin PEEK (1): polyether ether ketone (manufactured by VICTREX PLC., product name: PEEK 150XF, average particle diameter: 23 μm)

Thermoplastic resin PEEK (2): polyether ether ketone (manufactured by VICTREX PLC., product name: PEEK 150PF, average particle diameter: 50 μm)

7) Glass Fiber GF (1): circular cross-sectional glass fiber having a circular cross section (manufactured by NITTO BOSEKI CO., LTD., product name: PF80E-401, average fiber length: 80 μm×average diameter: φ 11 μm)

Glass Fiber GF (2): irregular shape (oblong) cross-sectional glass fiber having a non-circular (oblong) cross section (manufactured by NITTO BOSEKI CO., LTD., product name: SSF 05C-404, cross sectional shape: 7 μm×28 μm, average fiber length: 100 μm)

8) Fumed Silica (manufactured by NIPPON AEROSIL CO., LTD., product name: AEROSIL (trademark) R805)

TABLE 3

Composition of Bisphenol A type epoxy resin composition (% by weight)

| | Bisphenol A diglyceride ether (DGEBA) | Methyltetra-hydrophthalic acid anhydride (Me-THPA) | Tetraphenyl phosphonium bromide (TPP-PB) | Glass fiber (GF) | Polytetra fluoro ethylene (PTFE) | Fumed silica |
|---|---|---|---|---|---|---|
| Comparative Example 6 | 31.2 | 30.3 | 0.47 | 7.0 | 30 | 1.0 |

TABLE 4

Composition of Urethane resin composition (% by weight)

| | Urethane methacrylate | Polytetra fluoro ethylene (PTFE) | Molybdenum disulfide ($MoS_2$) | Glass fiber (GF) | Curing agent | Cure accelerator | Fumed silica |
|---|---|---|---|---|---|---|---|
| Comparative Example 7 | 54.6 | 30 | 5 | 10 | 0.1 | 0.1 | 0.2 |

TABLE 5

Composition of Acrylic resin composition (% by weight)

| | Dipenta-erythritol penta acrylate | Triethylene glycol dimethacrylate | Polytetra fluoro ethylene (PTFE) | Aramid fiber | Curing agent | Cure accelerator | Fumed silica |
|---|---|---|---|---|---|---|---|
| Comparative Example 8 | 34.6 | 33.9 | 30 | 1 | 0.2 | 0.1 | 0.2 |

<Manufacture of Self-Lubricating Liners>

Figure 1B:
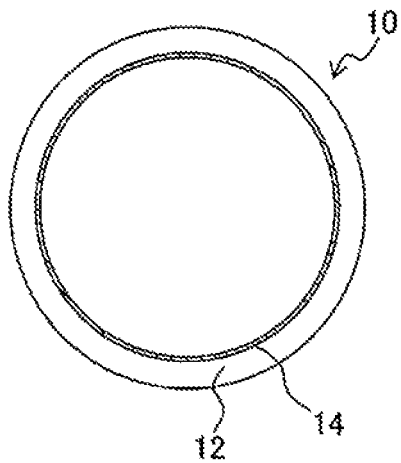
FIG. 1B is a lateral sectional view of the sleeve bearing cut along a direction perpendicular to the axis.

A cylindrical sleeve bearing (width (length in the axial direction): 12.7 mm, outer diameter: 30.2 mm, inner diameter: 24.9 mm) as shown in FIGS. 1A and 1B was manufactured by using a material obtained by subjecting SUS630 stainless steel to heat treatment under H1150 condition. Each of the resin compositions prepared in Examples 1 to 16 and Comparative Examples 1 to 8 was uniformly applied on the inner circumferential surface of this sleeve bearing by using a dispenser. Subsequently, the applied resin composition was heated to cure the resin composition, and thus a self-lubricating resin layer was formed in the inner circumferential surface of the sleeve bearing. Next, the self-lubricating resin layers formed by using the resin compositions of Examples 1 to 16 and Comparative Examples 1 to 6, respectively, were subjected to cutting and grinding so as to have a liner thickness of 0.25 mm; and the self-lubricating resin layers formed by using the resin compositions of Comparative Examples 7 and 8, respectively, were subjected to cutting and grinding so as to have a liner thickness of 0.38 mm, thereby completing the formation of machinable liners of Examples 1 to 16 and Comparative Examples 1 to 8.

Regarding the resin composition of Comparative Example 3, however, any film (liner) eligible for performing the evaluative test therefor could not be formed from the resin composition of Comparative Example 3. Accordingly, the machinable liners formed of the resin compositions of Examples 1 to 16 and Comparative Examples 1, 2 and 4 to 8, excluding Comparative Example 3, were subjected to performance evaluation by Evaluations 1 to 5 as explained below. TABLE 7 and TABLE 8 indicate the results of Evaluations 1 to 5 and the results of overall evaluation. Note that, together with these evaluations, TABLE 7 and TABLE 8 also indicate the weight ratio of the content amount of the mixture of the dicyanate compound and the bismaleimide compound to the content amount of the epoxy compound having the isocyanuric acid ring, namely, the weight ratio: (the mixture of the dicyanate compound and the bismaleimide compound)/(the epoxy compound) in Examples 1, 2, 4, 5, 7 to 10, 12 and 14 to 16 and Comparative Examples 1 to 3 and 5, and the weight ratio of the content amount of the dicyanate compound to the content amount of the epoxy compound having the isocyanuric acid ring, namely, the weight ratio: (the dicyanate compound)/(the epoxy compound) in Examples 3, 6, 11 and 13 and Comparative Examples 4. Further, TABLE 7 and TABLE 8 indicate the total content amount (% by weight) of the epoxy compound having the isocyanuric acid ring and the dicyanate compound, or the total content amount (% by weight) of the epoxy compound having the isocyanuric acid ring and the mixture of the dicyanate compound and the bismaleimide compound, in the thermosetting resin compositions prepared in Examples 1 to 16 and Comparative Examples 1 to 5.

<Performance Evaluation of Machinable Liners>

1. Radial Static Limit Load (Static Load Test) (Evaluation 1)

TABLE 6 below shows AS81934 standard requirements in this test. As indicated in the left column of TABLE 6, in AS81934 standard, the radial static limit load is defined based on the material (aluminum alloy and stainless steel) and the inner diameter size of the sleeve bearing. According to the material and the size of the sleeve bearing used in Examples 1 to 16 and Comparative Examples 1 to 8, the sleeve bearing corresponds to part number M81934/1-16C016 described in TABLE 6, and thus the maximum test load was determined to be 140 kN (31,400 lb).

TABLE 6

| Part No. | Radial static limit load (lb) | Oscillation load (lb) |
| --- | --- | --- |
| M81934/1-08A012 | 6,900 | 6,300 |
| M81934/1-08C012 | 10,800 | 6,300 |
| M81934/1-16A016 | 20,000 | 16,500 |
| M81934/1-16C016 | 31,400 | 16,500 |
| M81934/1-24A016 | 30,000 | 22,500 |
| M81934/1-24C016 | 47,100 | 22,500 |

Figure 2:
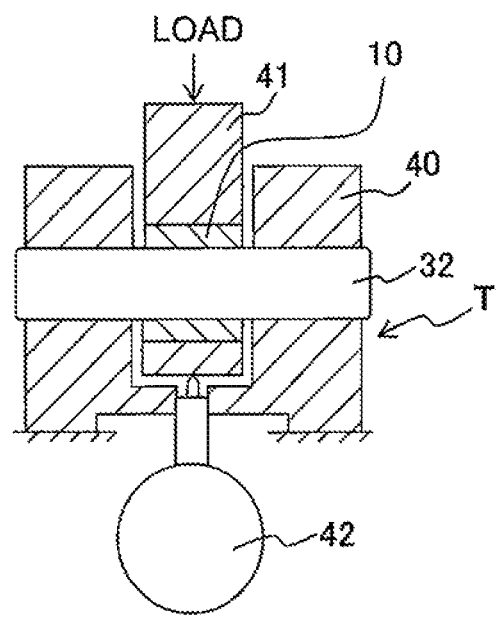
FIG. 2 shows a cross-sectional structure of a test jig in which a sleeve bearing manufactured in Examples is set.

As shown in FIG. 2, the sleeve bearing 10 is set on a test jig T first. The test jig T includes a base portion 40 which has a H-shaped cross section and which supports a shaft member 32, a weight 41 which applies the load in the radial direction of the sleeve bearing 10 into which the shaft member 32 is inserted, and a dial gauge 42 which is provided below the base portion 40. The shaft member 32 made of carbon steel is fitted to the inner circumferential surface of the sleeve bearing 10 to apply a load in the radial direction. The load is gradually increased up to a radial static limit load value 140 kN (31,400 lb). After reaching the radial static limit load value, the load is gradually removed. The displacement is measured by the dial gauge 42 during the test, and the permanent deformation amount when the load is returned to zero is read from the load-displacement curve. According to AS81934 standard requirement, this permanent deformation amount (maximum permissible permanent deformation amount after applying the radial static limit load) should be 0.051 mm (0.002 in) or less. The results of the evaluation of the static load test are indicated in TABLE 7 and TABLE 8 in each of which a case that the permanent deformation amount after applying the radial static limit load was 0.051 mm or less and satisfying the requirement of AS81934 standard is indicated with a sign "+", whereas a case that the permanent deformation amount after applying the radial static limit load exceeded 0.051 mm and not satisfying the requirement of AS81934 standard is indicated with a sign "−".

In each of self-lubricating liners obtained from the resin compositions prepared in Examples 1 to 16 and Comparative Examples 1, 2, 4 and 5 to 8, the permanent deformation amount after applying the radial static limit load was 0.51 mm or less, thus satisfying the requirement of AS81934 standard.

2. Oscillation Test Under Radial Load (Evaluation 2)

An oscillation test is performed at normal temperature, and at a high temperature that is a temperature of 163 degrees Celsius (+6 degrees Celsius/−0 degrees Celsius). AS81934 standard required in this oscillation test is that regarding the oscillation test at the normal temperature, the upper limit value of permissible wear amount of a liner after 1,000 cycles is 0.089 mm (0.0035 in), after 5,000 cycles is 0.102 mm (0.0040 in), and after 25,000 cycles is 0.114 mm (0.0045 in); and that regarding the oscillation test at the high temperature, the upper limit value of permissible wear amount of the liner after 25,000 cycles is 0.152 mm (0.0060 in).

At first, the oscillation test at normal temperature was performed as follows. A sleeve bearing 10 was set on the test jig T as shown in FIG. 2, and the load of 73.5 kN (16,500 lb) required in AS81934 standard as indicated in the right column of TABLE 6 was applied in the radial direction and maintained statically for 15 minutes. After 15 minutes, the amount of displacement in the dial gauge 42 was set to zero and the oscillation of the shaft 32 was started. The shaft member 32 was oscillated within an angular range of ±25 degrees. The oscillating movement of the shaft member 32 going from the angle position 0 degrees to +25 degrees and coming back to 0 degrees, and then going to −25 degrees and coming back again to 0 degrees was counted as 1 cycle. An oscillation rate should be set to 10 cycles per minute (10 CPM) or more. In the performed test, the oscillation rate was set to 20 cycles per minute. During this oscillation test, the wear amount was read from the dial gauge 42 and recorded. The oscillation test at high temperature was performed in a similar manner as in the oscillation test at normal temperature, except that the shaft 32 and the liner in the test jig T of FIG. 2 were maintained at the temperature of 163 degrees Celsius (+6 degrees Celsius/−0 degrees Celsius).

The results of the evaluation of the oscillation test are indicated in TABLE 7 and TABLE 8 in each of which a case that the wear amount of the liner after 25,000 cycles in the oscillation test at the normal temperature was 0.114 mm or less and satisfying the requirement of AS81934 standard is indicated with a sign "+", whereas a case that the wear amount of the liner after 25,000 cycles in the oscillation test at the normal temperature exceeded 0.114 mm and not satisfying the requirement of AS81934 standard is indicated with a sign "−". Further, in TABLE 7 and TABLE 8, a case that the wear amount of the liner after 25,000 cycles in the oscillation test at the high temperature was 0.152 mm or less and satisfying the requirement of AS81934 standard is indicated with a sign "+", whereas a case that the wear amount of the liner after 25,000 cycles in the oscillation test at the high temperature exceeded 0.152 mm and not satisfying the requirement of AS81934 standard is indicated with a sign "−".

The wear amount after 25,000 cycles in the oscillation test at normal temperature was 0.114 mm or less in Examples 1 to 16 and Comparative Examples 6 to 8, and thus satisfying the requirement of AS81934 standard. However, the wear amount after 25,000 cycles in the oscillation test at normal temperature in Comparative Examples 1, 2, 4 and 5 exceeded 0.114 mm and thus did not satisfy the requirement of AS81934 standard. Regarding Comparative Example 1, the weight ratio of the content amount of the mixture of the dicyanate compound and the bismaleimide compound to the content amount of the epoxy compound having the isocyanuric acid ring, namely, the weight ratio: (the mixture of the dicyanate compound and the bismaleimide compound)/(the epoxy compound)=0.57 which was a low value. On the other hand, in Comparative Example 2, this weight ratio was 5.40 which was a high value. It is presumed that a cured product (liner) having a sufficient wear resistance could not be obtained in Comparative Examples 1 and 2 since the weight ratio of the mixture of the dicyanate compound and the bismaleimide compound to the epoxy compound in Comparative Examples 1 and 2 was outside of the range of 0.65 to 4.00. Regarding Comparative Example 4, it is presumed a cured product (liner) having a sufficient mechanical strength could not be obtained in Comparative Example 4 since the content amount of PTFE was excessive and the content amount of the epoxy compound having the isocyanuric acid ring and the content amount of the dicyanate compound were consequently low. Regarding Comparative Example 5, it is presumed that a cured product (liner) having the wear resistance could not be obtained in Comparative Example 5 since the content amount of PTFE was small and the content amount of the epoxy compound having the isocyanuric acid ring and the content amount of the mixture of the dicyanate compound and the bismaleimide compound were high and thus any sufficient lubricating property could not be obtained in Comparative Example 5.

The wear amount after 25,000 cycles in the oscillation test at high temperature was 0.152 mm or less in all of Examples 1 to 16 and in Comparative Example 7, and thus satisfying the requirement of AS81934 standard. However, the wear amount after 25,000 cycles in the oscillation test at high temperature exceeded 0.152 mm in Comparative Examples 1, 2, 4, 5, 6 and 8, and thus did not satisfy the requirement of AS81934 standard. The self-lubricating liner formed by using the bisphenol A type epoxy resin composition prepared in Comparative Example 6, and the self-lubricating liner formed by using the acrylic resin composition prepared in Comparative Example 8 satisfied the requirement of AS81934 standard in the oscillation test at the normal temperature, but could not satisfy AS81934 standard in the oscillation test at the high temperature that was the severer test.

3. Oil Resistance Validation Test (Evaluation 3)

AS81934 standard required in this oil resistance validation test is that the upper limit value of permissible wear amount of a liner after the oil resistance validation test is 0.152 mm (0.0060 in). Sleeve bearings 10 respectively having the machinable liners manufactured as described above were immersed in each of oils of six kinds of "a" to "f", as indicated below, at temperature of 71 degrees Celsius±3 degrees Celsius for 24 hours, and then taken out from each of the oils, and subjected to the above-described oscillation test at the normal temperature within 30 minutes or less after being taken out from the oil. Note that, however, regarding the oil "b", the immersion was performed at temperature of 43 degrees Celsius±3 degrees Celsius for 24 hours; and regarding the oil "e", an oscillation test at the normal temperature was performed at a contact pressure condition that was 75% of that of the above-described oscillation test at the normal temperature.

The used oils were as follows.
Oil "a": Skydrol (trademark) 500B working fluid
Oil "b": MIL-DTL-5624 turbine fuel oil JP4 or JP5
Oil "c": MIL-PRF-7808 lubricating oil
Oil "d": MIL-PRF-5606 hydraulic oil
Oil "e": AS8243 anti-freezing agent
Oil "f": MIL-PRF-83282 working fluid As the results of the oil resistance validation test, the wear amount after 25,000 cycles in the oscillation test at normal temperature after the immersion in the oil for 24 hours was 0.152 mm or less regarding all the oils "a" to "f" in all of Examples 1 to 16 and in Comparative Examples 6 to 8, and satisfying the requirement of AS81934 standard and indicated with the sign "+" in TABLE 7 and TABLE 8. On the other hand, in Comparative Examples 1, 2, 4 and 5, the wear amount after 25,000 cycles in the oscillation test at normal temperature after the immersion in the oil for 24 hours exceeded 0.152 mm regarding all the oils "a" to "f", and thus not satisfying the requirement of AS81934 standard and indicated with the sign "−" in TABLE 8.

The reason that the oil resistance was low in Comparative Examples 1, 2, 4 and 5 are presumed to be similar to the presumed reason for the low wear resistance in Comparative Examples 1, 2, 4 and 5 in the above-described "Evaluation 2".

4. Oscillation Test at High Temperature (Evaluation 4)

An oscillation test was performed under similar conditions as that in the oscillation test under radial load (Evaluation 2) in accordance with AS81934 standard as described above, except that the temperatures of the shaft 32 and the liner in the test jig T of FIG. 2 were maintained at high temperatures of 180 degrees Celsius, 200 degrees Celsius and 300 degrees Celsius, and the wear amounts after 25,000 cycles of the oscillation test at high temperatures were measured. Note that this oscillation test (Evaluation 4) was performed for all of Examples 1 to 16 and for Comparative Example 7 in which the results of the above-described Evaluations 1 to 3 were all "+". Further, regarding Comparative Example 7, the wear amount was measured only under a condition that the temperatures of the shaft 32 and the liner in the test jig T of FIG. 2 were maintained at 200 degrees Celsius. The results of the measurement of wear amount are indicated in TABLE 7 and TABLE 8. Note that in TABLE 7 and TABLE 8, the wear amounts were indicated in millimeters (mm).

In this oscillation test at high temperature, in a case that the wear amount after 25,000 cycles of the oscillation test at 200 degrees Celsius in a liner was 0.152 mm or less, the liner was considered to have sufficient wear resistance at high temperature. As indicated in TABLE 7, in all of Examples 1 to 16, the wear amount after 25,000 cycles of the oscillation test at 200 degrees Celsius was 0.152 mm or less, and all of Examples 1 to 16 were considered to have sufficient wear resistance at high temperature. On the other hand, in Comparative Example 7, the wear amount after 25,000 cycles of the oscillation test at 200 degrees Celsius was 0.187 mm that exceeded 0.152 mm as indicated in TABLE 8, and the wear resistance at high temperature of Comparative Example 7 was not sufficient.

Further, in this oscillation test at high temperature, in a case that after a liner was subjected to the wearing by 25,000 cycles of the oscillation test at 300 degrees Celsius and that the thickness (after the wearing) of the liner was such an amount (0.25 mm or less) that did not cause the metal in the base layer to be exposed in the liner, the liner was considered to have sufficient wear resistance at 300 degrees Celsius. As indicated in TABLE 7, in all of Examples 1 to 16, the wear amount after 25,000 cycles of the oscillation test at 300 degrees Celsius was 0.25 mm or less, and all of Examples 1 to 16 were considered to have sufficient wear resistance also at 300 degrees Celsius.

5. Measurement of Friction Coefficient (Evaluation 5)

An oscillation test was performed, by attaching a torque detector to the test jig T of FIG. 2, under similar condition as that in the oscillation test under radial load (Evaluation 2) in accordance with AS81934 standard as described above, and the torque after 25,000 cycles of the oscillation test at normal temperature was measured. The friction coefficients of the respective liners were calculated by using the obtained torque values and in accordance with the following formula.

$$(\text{Friction Coefficient}) = T/(F \times r)$$

T: Torque (Nm)
F: Radial load (N)
r: Radius of shaft (m)

Note that this measurement (Evaluation 5) was performed for all of Examples 1 to 16 in which the results of the above-described Evaluations 1 to 3 were all "+", and for Comparative Examples 6 to 8 in which the results of the above-described Evaluation 1 and Evaluation 2 under the normal temperature condition were "+". The results of this measurement are indicated in TABLE 7 and TABLE 8.

As indicated in TABLE 7 and TABLE 8, the friction coefficient of each of Comparative Examples 6 to 8 was in a range of 0.043 to 0.051. On the other hand, the average value of the friction coefficients of Examples 1 to 16 was 0.036 that is a value lower by 10% or more as compared with the value of the coefficient friction of each of Comparative Examples 6 to 8. The reason for the above result is presumed that the resin composition in each of Examples 1 to 16 contained PTFE as the solid lubricant in a range of 10% by weight to, maximally, 70% by weight. For example, Example 5 containing a large amount of PTFE (70% by weight) had a quite low friction coefficient of 0.018.

Table 7 and Table 8 (Following)—Legend

"+": satisfying the requirement of AS81934 standard
"−": not satisfying the requirement of AS81934 standard
"N/A": data not obtained since the measurement was not performed

TABLE 7

| Examples | (DC compound)/ (Epoxy compound), or (Mixture of DC Compound and BMI Compound)/ (Epoxy compound) | Total of content amounts (wt %) of Epoxy compound, DC compound, and BMI compound | Evaluation 1: Static Load Test | Evaluation 2: Oscillation test | | Evaluation 3: Oil Resistance Validation Test | Evaluation 4: Oscillation test at high temperature | | | Evaluation 5: Friction Coefficient | Overall Evaluation |
|---|---|---|---|---|---|---|---|---|---|---|---|
| | | | | Normal Temperature | High Temperature | | 180° C. | 200° C. | 300° C. | | |
| 1 | 1.00 | 52.0 | + | + | + | + | 0.005 | 0.010 | 0.100 | 0.036 | + |
| 2 | 1.00 | 47.3 | + | + | + | + | 0.012 | 0.051 | 0.130 | 0.035 | + |
| 3 | 1.00 | 39.0 | + | + | + | + | 0.007 | 0.012 | 0.092 | 0.029 | + |
| 4 | 1.00 | 49.0 | + | + | + | + | 0.006 | 0.011 | 0.095 | 0.030 | + |
| 5 | 1.00 | 25.0 | + | + | + | + | 0.034 | 0.062 | 0.154 | 0.018 | + |
| 6 | 3.90 | 49.0 | + | + | + | + | 0.073 | 0.132 | 0.210 | 0.032 | + |
| 7 | 0.67 | 87.0 | + | + | + | + | 0.061 | 0.130 | 0.203 | 0.080 | + |
| 8 | 1.00 | 49.0 | + | + | + | + | 0.006 | 0.017 | 0.103 | 0.041 | + |
| 9 | 1.00 | 49.0 | + | + | + | + | 0.005 | 0.010 | 0.088 | 0.024 | + |
| 10 | 1.00 | 49.0 | + | + | + | + | 0.051 | 0.087 | 0.166 | 0.019 | + |
| 11 | 1.00 | 41.0 | + | + | + | + | 0.028 | 0.054 | 0.114 | 0.042 | + |
| 12 | 1.00 | 55.0 | + | + | + | + | 0.034 | 0.058 | 0.135 | 0.028 | + |
| 13 | 1.00 | 45.0 | + | + | + | + | 0.005 | 0.010 | 0.105 | 0.034 | + |
| 14 | 1.00 | 44.0 | + | + | + | + | 0.042 | 0.089 | 0.180 | 0.042 | + |
| 15 | 1.00 | 59.0 | + | + | + | + | 0.005 | 0.02 | 0.108 | 0.044 | + |
| 16 | 1.00 | 49.0 | + | + | + | + | 0.006 | 0.024 | 0.115 | 0.039 | + |

TABLE 8

| Comparative Examples | (DC compound)/ (Epoxy compound), or (Mixture of DC Compound and BMI Compound)/ (Epoxy compound) | Total of content amounts (wt %) of Epoxy compound, DC compound, and BMI compound | Evaluation 1: Static Load Test | Evaluation 2: Oscillation test | | Evaluation 3: Oil Resistance Validation Test | Evaluation 4: Oscillation test at high temperature | | Evaluation 5: Friction Coefficient | Overall Evaluation |
|---|---|---|---|---|---|---|---|---|---|---|
| | | | | Normal Temperature | High Temperature | | 180° C. | 200° C. | | |
| 1 | 0.57 | 55.0 | + | − | − | − | N/A | N/A | N/A | − |
| 2 | 5.40 | 64.0 | + | − | − | − | N/A | N/A | N/A | − |
| 3 | 1.00 | 19.0 | N/A | N/A | N/A | N/A | N/A | N/A | N/A | − |
| 4 | 1.00 | 19.0 | + | − | − | − | N/A | N/A | N/A | − |
| 5 | 1.00 | 84.0 | + | − | − | − | N/A | N/A | N/A | − |
| 6 | N/A | N/A | + | + | − | + | N/A | N/A | 0.051 | − |
| 7 | N/A | N/A | + | + | + | + | N/A | 0.187 | 0.043 | − |
| 8 | N/A | N/A | + | + | − | + | N/A | N/A | 0.047 | − |

6. Overall Evaluation

The overall evaluation was determined to be "+" in a case that all of the requirements of AS81934 standard were satisfied in Evaluations 1 to 3 and that the wear amount in the oscillation test at 200 degrees Celsius in Evaluation 4 was 0.152 mm or less. On the other hand, the overall evaluation was determined to be "−" in a case that the requirement of AS81934 standard was not satisfied in any one of Evaluations 1 to 3 or that the wear amount in the oscillation test at 200 degrees Celsius in Evaluation 4 exceeded 0.152 mm. Further, Comparative Example 3 in which a film (liner) appropriate for performing the evaluative test could not be obtained received an overall evaluation of "−". The results of overall evaluation are shown in TABLE 7 and TABLE 8. The overall evaluation was "+" in all of Examples 1 to 16, whereas the overall evaluation was "−" in all of Comparative Examples 1 to 8.

The reason that any film (liner) appropriate for performing the evaluative test therefor could not be obtained in Comparative Example 3 is presumed as follows. The film forming property was lowered because the content amount of PEEK was excessive, and consequently the content amount of the epoxy compound having the isocyanuric acid ring and the content amount of the mixture of the dicyanate compound and the bismaleimide compound became insufficient.

7. Comparative Test of Surface Roughness of Base Surface

In order to evaluate separation resistance (adhesion property) of the self-lubricating liner (machinable liner) with respect to the inner circumferential surface of the sleeve bearing, test samples were manufactured in the following manner. Namely, before applying the resin composition on each of the cylindrical sleeve bearings (width: 12.7 mm, outer diameter: 30.2 mm, inner diameter: 24.9 mm) used in the above-described evaluations, the inner circumferential surface of each of the sleeve bearings was roughened by the sand blasting process so that the inner circumferential surface had one of the four kinds of surface roughness as indicated in the following TABLE 9. Subsequently, the resin composition prepared in the above-described Example 1 was applied on the inner circumferential surface, and the heating was performed under a heating condition similar to that in the case of manufacturing the machinable liners used in the above-described tests, to thereby form a self-lubricating resin layer. The self-lubricating resin layer was subjected to cutting and grinding until the thickness of the self-lubricating resin layer became 0.25 mm, and the inner diameter of the sleeve bearing was finished to be 25.4 mm. Regarding the sleeve bearings each produced in the above-described manner and having the inner circumferential surface roughened to have one of the four kinds of surface roughness and provided with the machinable liner, the comparative test of surface roughness of base surface was performed under each of the following conditions "A" to "D", and the presence/absence of separation was visually checked.

Condition A: Verification of the separation of resin by cutting the sliding surface: Turning process was performed for the sleeve bearing so as to cut the machinable liner at a cutting depth of 0.3 mm, and the presence or absence of separation of the machinable liner was observed.

Condition B: Verification of the separation of resin after keeping the sleeve bearing in liquid nitrogen (−196 degrees Celsius) for 15 minutes: The presence or absence of separation of the resin when the sleeve bearing was removed from the liquid nitrogen was observed.

Condition C: The sleeve bearing was subjected to an oscillation at the normal temperature with a contact pressure of 275 MPa in accordance with AS81934 standard described above, and the presence or absence of separation of the machinable liner up to 25,000 cycles was observed.

Condition D: The sleeve bearing subjected to an oscillation at a temperature of 163 degrees Celsius and with a contact pressure of 275 MPa in accordance with AS81934 standard as described above, and the presence or absence of separation of the machinable liner up to 25,000 cycles was observed.

TABLE 9 indicates the results of the separation test (comparative test of surface roughness of base surface). In TABLE 9, a sign "+" means that no separation was present, whereas a sign "−" means that separation was present.

Table 9 (Following)—Legend

"+": No separation was present.
"−": Separation was present.

TABLE 9

| Base surface roughness Ra | Performed test items | | | |
|---|---|---|---|---|
| | A | B | C | D |
| 0.2 μm | + | + | + | + |
| 1.0 μm | + | + | + | + |
| 2.0 μm | + | + | + | + |
| 4.0 μm | + | + | + | + |

For comparison, sleeve bearings, each provided with a machinable liner on the inner circumferential surface of which surface roughness was one of the four kinds of surface roughness as described above, were manufactured in a similar manner as described above, except that the machinable liner was formed by using a resin composition containing a thermoplastic resin instead of the thermosetting resin. The resin composition containing the thermoplastic resin was obtained in accordance to the method described in Example 1 of Japanese Patent Application Laid-open No. 2011-247408 by the applicant of the present teaching. Namely, 70% by weight of polyether ketone, 10% by weight of a PAN-based carbon fiber and 20% by weight of PTFE were mixed. Then, the obtained mixture was applied on the inner circumferential surface of the sleeve bearing by the injection molding to form a machinable liner, and the machinable liner was subjected to cutting and grinding until the machinable liner had a thickness of 0.25 mm. The test regarding the adhesion property was performed also for this machinable liner, and the results of the test is indicated in TABLE 10.

Table 10 (Following)—Legend

"+": No separation was present.
"−": Separation was present.

TABLE 10

| Base surface roughness Ra | Performed test items | | | |
|---|---|---|---|---|
| | A | B | C | D |
| 0.2 μm | − | − | − | − |
| 1.0 μm | − | − | − | − |
| 2.0 μm | − | − | − | − |
| 4.0 μm | + | + | + | + |

From the results indicated in TABLE 9, no separation was observed in the resin composition related to the present teaching in any cases of the surface roughness Ra of 0.2 µm to 4.0 µm. In contrast, in the case of forming the machinable liner from the resin composition using the thermoplastic resin, it is appreciated from the results indicated in TABLE 10 that any sufficient adhesion property could not be obtained unless the inner circumferential surface of the sleeve bearing was processed to have the surface roughness Ra of about 4.0 µm. From the above-described points, it is appreciated that the machinable liner formed by the resin composition according to the present teaching is capable of realizing a satisfactory adhesion property without depending on the roughness of the base surface, and that the process for roughening the base surface is not necessary for forming the self-lubricating liner in accordance with the present teaching.

8. Evaluation of Thickness of Self-Lubricating Liner

In order to evaluate the thickness of the self-lubricating liner, test samples were manufactured in the following manner. Namely, the resin compositions prepared in Examples 1, 2 and 3 and in Comparative Example 7 were applied by using a dispenser on the sleeve bearings (width: 12.7 mm, outer diameter: 30.2 mm, inner diameter: 24.9 mm) used in the above-described tests, so that each of the sleeve bearings was applied with one of the resin compositions prepared in Examples 1, 2 and 3 and in Comparative Example 7 of which thickness was 0.3 mm, 0.5 mm, 0.7 mm, 1.0 mm or 2.0 mm. Next, the applied resin compositions were heated to be thermally cured under the same heating condition as that in the formation of the machinable liners used in the above-described tests, so as to form a self-lubricating liner on the inner circumferential surface of each of the sleeve bearings. Regarding the sleeve bearings provided with these 20 kinds of liners, respectively, manufactured in such a manner, the presence or absence of any resin separation or resin cracking due to the shrinking during the thermal curing was visually evaluated. The results of the evaluation is indicated in TABLE 11.

Table 11 (Following)—Legend

"+": Neither resin separation nor resin cracking was present.
"−": Resin separation or resin cracking was present.

TABLE 11

| Thickness (mm) | Example 1 | Example 2 | Example 3 | Comparative Example 7 |
|---|---|---|---|---|
| 0.3 | + | + | + | + |
| 0.5 | + | + | + | + |
| 0.7 | + | + | + | + |
| 1.0 | + | + | + | − |
| 2.0 | + | + | + | − |

As appreciated from the results indicated in TABLE 11, neither resin cracking nor resin separation was observed in the self-lubricating liners composed of the resin compositions prepared in Examples 1, 2 and 3 respectively, in any cases of the thickness of 0.3 mm to 2.0 mm. In contrast, in the liner composed of the urethane resin composition prepared in Comparative Example 7, the resin separation or resin cracking was confirmed at the thickness of 1.0 mm or more. It is appreciated from the results indicated in TABLE 11 that the resin compositions prepared in Examples 1, 2 and 3 had a smaller compression during the thermal curing than the urethane resin composition prepared in Comparative Example 7, and were capable of forming a thick film while suppressing the resin separation and resin cracking as compared with the urethane resin composition prepared in Comparative Example 7. Since the resin compositions prepared in Examples 1, 2 and 3 are capable of forming a thick machinable liner, it is possible to widen the range for size adjustment through the cutting and grinding.

9. Influence of Particulate Thermoplastic Resin (PEEK) to Friction Coefficient and Wear Amount In order to evaluate the influence of PEEK as the particulate thermoplastic resin to the friction coefficient and wear amount in a case that the PEEK is contained in the resin composition, the test as explained below was performed for the self-lubricating liners respectively formed by the resin compositions prepared in Examples 8, 9, 15 and 16 and used in the above-described tests (Evaluations 1 to 5). The resin composition prepared in Example 8 is a resin composition containing 30% by weight of PTFE as the solid lubricant and 10% by weight of PEEK with the diameter of 23 µm; the resin composition prepared in Example 9 is a resin composition containing 30% by weight of PTFE and 10% by weight of PEEK with the diameter of 50 µm; the resin composition prepared in Example 15 is a resin composition containing 30% by weight of PTFE and does not contain any PEEK; and the resin composition prepared in Example 16 is a resin composition containing 40% by weight of PTFE and does not contain any PEEK.

Regarding each of the self-lubricating liners composed of the resin compositions prepared in Examples 8, 9, 15 and 16, respectively, the frictions coefficients at 1,000 cycles, 5,000 cycles, 10,000 cycles, 15,000 cycles, 20,000 cycles and 25,000 cycles were obtained by using a method similar to that used in the measurement of friction coefficient as described above (Evaluation 5). The results of the measurement of friction coefficients are indicated in TABLE 12. Further, the wear amounts after 1,000 cycles, 5,000 cycles, 10,000 cycles, 15,000 cycles, 20,000 cycles and 25,000 cycles were obtained by using a method similar to that used in the oscillation test at the high temperature as described above (Evaluation 4). The results of the measurement of wear amounts are indicated in TABLE 13. Note that in the measurement of friction coefficient and the measurement of wear amount, the temperatures of the shaft 32 and the liner in the test jig T of FIG. 2 were maintained at 300 degrees Celsius.

TABLE 12

| | Friction Coefficient | | | |
|---|---|---|---|---|
| No. of cycles | Example 8 PTFE 30 wt % PEEK (23 µm) 10 wt % | Example 9 PTFE 30 wt % PEEK (50 µm) 10 wt % | Example 15 PTFE 30 wt % PEEK 0 wt % | Example 16 PTFE 40 wt % PEEK 0 wt % |
| 1,000 | 0.068 | 0.071 | 0.068 | 0.064 |
| 5,000 | 0.062 | 0.044 | 0.059 | 0.057 |
| 10,000 | 0.055 | 0.042 | 0.057 | 0.057 |
| 15,000 | 0.054 | 0.040 | 0.060 | 0.056 |
| 20,000 | 0.057 | 0.039 | 0.058 | 0.055 |
| 25,000 | 0.056 | 0.039 | 0.059 | 0.055 |

TABLE 13

| | Wear Amount (mm) | | | |
|---|---|---|---|---|
| No. of cycles | Example 8 PTFE 30 wt % PEEK (23 μm) 10 wt % | Example 9 PTFE 30 wt % PEEK (50 μm) 10 wt % | Example 15 PTFE 30 wt % PEEK 0 wt % | Example 16 PTFE 40 wt % PEEK 0 wt % |
| 1,000 | 0.004 | 0.003 | 0.003 | 0.003 |
| 5,000 | 0.021 | 0.018 | 0.023 | 0.025 |
| 10,000 | 0.042 | 0.035 | 0.043 | 0.047 |
| 15,000 | 0.061 | 0.053 | 0.065 | 0.068 |
| 20,000 | 0.082 | 0.07 | 0.086 | 0.088 |
| 25,000 | 0.103 | 0.088 | 0.108 | 0.115 |

As indicated in TABLE 12, at 25,000 cycles, each of Examples 8 and 9 containing 30% by weight of PTFE and further containing 10% by weight of PEEK had a lower friction coefficient than that of Example 15 containing 30% by weight of PTFE but containing no PEEK. Even comparing Example 8 and Example 9 with Example 16 containing 40% by weight of PTFE but containing no PEEK, the friction coefficient of Example 8 at 25,000 cycles were similar to that of Example 16; and the friction coefficient of Example 9 at 25,000 cycles was lower than that of Example 16. From these results, PEEK as the particulate thermoplastic resin is presumed to have the effect of lowering the friction coefficient at a high temperature (300 degrees Celsius), similarly to the effect obtained by the solid lubricant.

As indicated in TABLE 13, each of Examples 8 and 9 containing PTFE and further containing PEEK had smaller wear amount than those of Comparative Examples 15 and 16 each containing PTFE but containing no PEEK. Further, the tensile strength of PTFE is in a range of 13.7 MPa to 34.3 MPa (literature data), and the tensile strength of PEEK is 92 MPa (literature data) that is greater than the tensile strength of PTFE. From these results and facts, it is presumed that PEEK as the particulate thermoplastic resin has an effect of improving the wear resistance.

10. Measurement of Infrared Absorption Spectrum

Regarding resins (cured products) obtained by subjecting the resin compositions prepared in Example 4 and Comparative Example 6, respectively, to the thermal curing under a condition similar to that during the manufacturing the above-described machinable liners, the infrared absorption spectra (FT-IR) of the resins (cured products) were measured. The results of measurement of the infrared absorption spectra (FT-IR) are indicated in FIG. 7.

Figure 7:
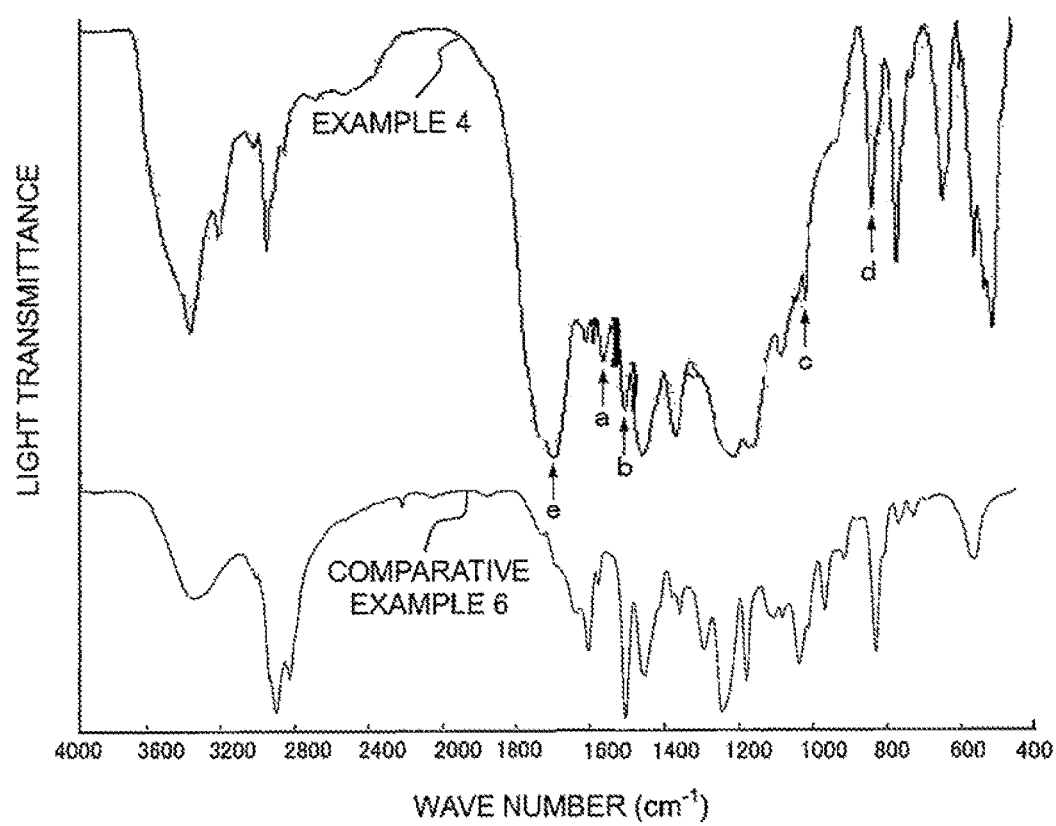
FIG. 7 indicates infrared absorption spectra of cured products of thermosetting resin compositions prepared in Example 4 and Comparative Example 6.

In the infrared absorption spectrum of Example 4, absorption peaks (833 cm$^{-1}$, 1,015 cm$^{-1}$ 1,507 cm$^{-1}$ and 1,564 cm$^{-1}$) derived from the BT resin as indicated by arrows (a) to (d) in FIG. 7, and an absorption peak (1,701 cm$^{-1}$) by the C=O bond in the isocyanuric acid ring as indicated by an arrow (e) could be confirmed. It is well-known that the absorption peak by the C=O bond in the isocyanuric acid ring appears in a range of 1,690 cm$^{-1}$ to 1,720 cm$^{-1}$. On the other hand, in the infrared absorption spectra of the bisphenol A type epoxy resin of Comparative Example 6, all of the above-described absorption peaks could not be confirmed. As described above, it was appreciated that the resin composition containing the epoxy compound having the isocyanuric acid ring represented by the formula (1), the dicyanate compound and the bismaleimide compound are heated to thereby form a cured product containing the BT resin. Further, since the cured product has the absorption peaks derived from the BT resin approximately at 833 cm$^{-1}$, 1,015 cm$^{-1}$ 1,507 cm$^{-1}$ and 1,564 cm$^{-1}$, and has the absorption peak derived from the isocyanuric acid ring in the range of 1,690 cm$^{-1}$ to 1,720 cm$^{-1}$, the cured product can be distinguished from epoxy resins of the different kinds by using the measurement of infrared absorption spectrum, and can be identified.

In Examples 1 to 16 as described above, the resin composition related to the present teaching was applied to the sleeve bearing with the shape as shown in FIG. 1. However, the application of the resin composition related to the present teaching is not limited to the sleeve bearing of this shape, and it is possible to apply the resin composition related to the present teaching to sliding members having a variety of shapes and structures.

<Spherical Bearing>

Figure 3:
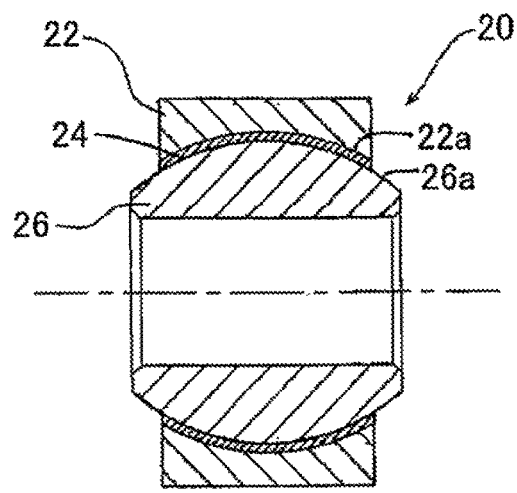
FIG. 3 is a cross-sectional view of the structure of a spherical bearing provided with a self-lubricating liner made from a resin composition related to the present teaching.

As shown in FIG. 3, a spherical bearing 20 includes an outer race (outer ring) 22 having a concave spherical inner circumferential surface 22a, an inner race (inner ring) 26 having a convex spherical outer circumferential surface 26a, and a machinable liner 24 formed between the inner circumferential surface 22a and the outer circumferential surface 26a. The thickness of the liner may be, for example, about 0.25 mm.

Figure 4A:
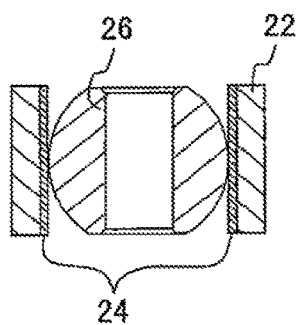
FIGS. 4A to 4C are views explaining a manufacturing process of the spherical bearing provided with the self-lubricating liner made from the resin composition related to the present teaching.
Figure 4B:
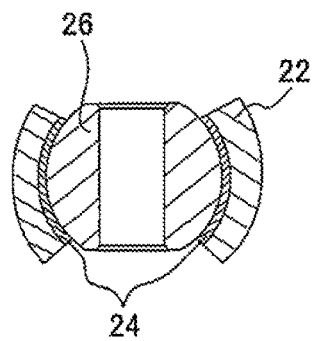
Figure 4C:
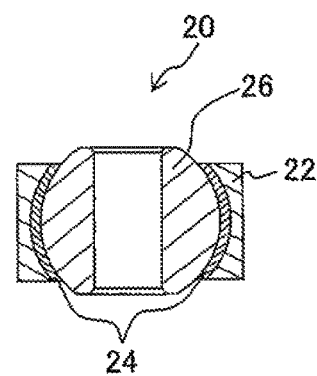

The spherical bearing 20 can be manufactured by a process using swage process, for example, as shown in FIG. 4A to FIG. 4C. At first, a resin composition 24 prepared in Example 2 is applied on the inner circumferential surface (sliding surface) 22a of the outer race (body) 22, and the resin composition is primarily cured by being heated. Accordingly, the machinable liner (24) is formed. Then, the inner race 26 is inserted into the outer race 22 (FIG. 4A). Next, by the swage process, the outer race 22 is plastically deformed with a press so as to follow the outer circumferential surface of the inner race 26 (FIG. 4B). Then, the machinable liner 24 is secondarily cured by being heated. Subsequently, the outside of the outer race 22 is finished by cutting process to thereby make it possible to complete the spherical bearing 20 (FIG. 4C).

After the resin composition has been primarily cured, the resin composition is allowed to follow the deformation of the outer race in the swage process. Accordingly, it is possible to form a liner having a uniform thickness in the spherical bearing.

<Rod End Spherical Bearing>

Figure 5A:
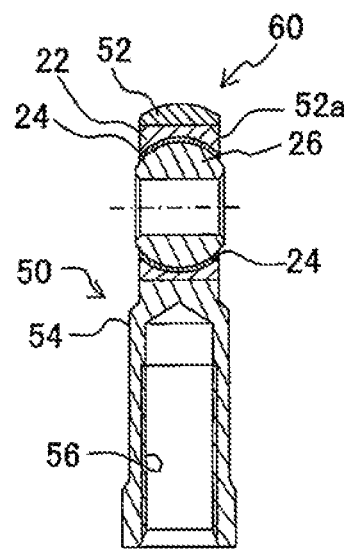
FIG. 5A is a longitudinal sectional view of a rod end spherical bearing into which the spherical bearing related to the present teaching is incorporated.
Figure 5B:
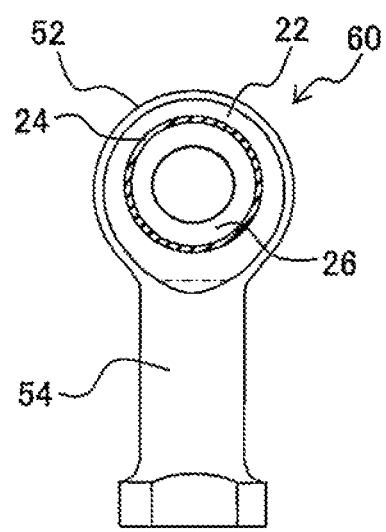
FIG. 5B is a lateral sectional view of the same.

FIGS. 5A and 5B each show an exemplary rod end spherical bearing 60 in which the spherical bearing 20 is incorporated into a rod end body 50. The rod end body 50 is composed of a head portion 52 having a through hole 52a into which the spherical bearing 20 is incorporated, and a shaft portion 54 provided with a female or male thread 56. The shaft portion 54 is a body in a substantially cylindrical shape extending from the head portion 52 in a radial direction of the through hole 52a. After the spherical bearing 20 is inserted in the through hole 52a, a V-shaped groove (not shown) formed at the edge of the through hole 52a is swaged, so that the spherical bearing 20 is fixed to the rod end body 50.

<Reamer Bolt>

Figure 6:
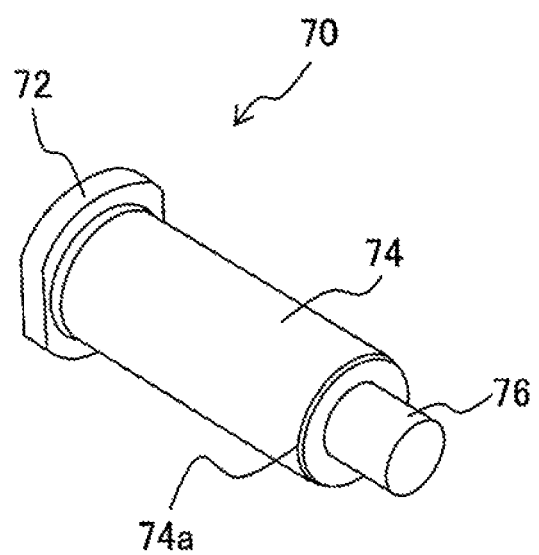
FIG. 6 is a view of an outer appearance of a reamer bolt provided with a self-lubricating liner which is made from the resin composition related to the present teaching and formed on a shaft surface of the reamer bolt.

A reamer bolt 70 as shown in FIG. 6 includes a main body portion composed of a head portion 72, a shaft portion 74 having a large diameter and a male thread portion 76 having a small diameter, and a machinable liner 74a provided on the outer circumference surface (sliding surface) of the shaft portion 74. The machinable liner 74a is formed by uniformly applying and curing the resin composition of any one of Examples 1 to 16 as described above with the method described in Examples 1 to 16 as described above. The main body portion of the reamer bolt 70 is formed, for example, by SUS630 stainless steel. The thickness of the machinable liner 74*a* may be in the range of about 0.25 mm to about 0.5 mm.

The reamer bolt 70 is used in important connection portions transmitting a high torque, such as a propeller shaft of vessels or ships, a flight control surface (movable vane) of aircraft, and a connecting rod of automobile engines. The reamer bolt 70 used in such important connection portions is required to be fitted to a bolt hole with high precision without any play. Therefore, the shaft portion 74 of the reamer bolt 70 is finished with high precision, but even so, it is advantageous that the size adjustment of the bolt can be performed at the time of assembly. Since the reamer bolt related to the present teaching includes the machinable liner 74*a*, the user can easily adjust the size of outer diameter of the shaft portion (body portion) even after curing of the resin. Further, the reamer bolt related to the present teaching includes the self-lubricating machinable liner 74*a* on the shaft portion 74, and thus even when the bolt is inserted or removed at the time of assembly or disassembly, any galling and the like do not occur, resulting in a reamer bolt 70 with a long service life.

Although the present teaching has been explained by the examples, the present teaching is not limited to the examples and can be substantiated in various embodiments and aspects within the scope of the claims. For example, in the specific examples as described above, the self-lubricating liner is formed on the inner circumferential surface of an outer race of a spherical bearing and a rod end spherical bearing. The self-lubricating liner, however, may be formed on the outer circumferential surface of an inner race of the spherical bearing and the rod end spherical bearing. Further, although the explanation has been made by citing the spherical bearing, the rod end spherical bearing and the reamer bolt as examples of the sliding member, the present teaching is not limited to these bearings and bolt, and the present teaching can be applied to any sliding member provided that the sliding member includes the self-lubricating liner. Especially, although the explanation has been made in the above embodiment by citing the sliding member used for the rotary motion of a member or part, the sliding member related to the present teaching includes not only that for the rotary motion but also a sliding member used for sliding motion, of a member or part, in any direction such as translational motion (linear motion), oscillating motion, and any combination thereof.

As described above, the resin composition related to the present teaching can be used as the self-lubricating liner by being applied on the sliding surface of the sliding member and being cured by being heated. Since the adhesion of the cured resin composition to the base surface is extremely strong, the process for roughening the base surface can be omitted. Therefore, a relatively large amount of PTFE can be contained while ensuring the safety of work, and also the equipment cost can be reduced. The self-lubricating liner manufactured as described above can be formed in various sliding members including sliding bearings such as a sleeve bearing and a spherical bearing. By making the sliding member have the self-lubricating liner made from the resin composition related to the present teaching, the surface of the liner can be subjected to the cutting, the grinding, and the like, which makes it possible to perform the fine-adjustment of inner diameter size of the bearing when the shaft is installed by an end-user. Therefore, the resin composition related to the present teaching and the sliding member provided with the self-lubricating liner made from the resin composition related to the present teaching are very useful in wide fields such as vessels, aircraft, automobiles, electronic products, home electric appliances, and the like.

What is claimed is:
1. A sliding member comprising:
a sliding surface; and
a self-lubricating liner formed on the sliding surface by a thermosetting resin composition and formed on the sliding surface,
wherein the thermosetting resin composition comprises:
an epoxy compound having an isocyanuric acid ring represented by the following formula (1):

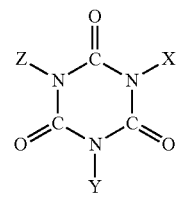

in the formula (1), at least one of X, Y or Z is a group containing an epoxy ring, and when one or two of X, Y or Z contains no epoxy ring, the one or two of X, Y or Z containing no epoxy ring is an atom of H, a group composed only of C and H, or a group composed only of C, H and O;
a solid lubricant; and
a dicyanate compound, or the dicyanate compound and a bismaleimide compound;
wherein the solid lubricant is contained in an amount of 10% by weight to 70% by weight in the thermosetting resin composition;
a total content amount (L+M) of a content amount (L) of the epoxy compound having the isocyanuric acid ring and a content amount (M) of the dicyanate compound, or a total content amount (L+M+N) of the content amount (L) of the epoxy compound having the isocyanuric acid ring, the content amount (M) of the dicyanate compound, and a content amount (N) of the bismaleimide compound is in a range of 20% by weight to 90% by weight; and
a weight ratio (M/L) of the content amount (M) of the dicyanate compound to the content amount (L) of the epoxy compound having the isocyanuric acid ring, or a weight ratio ((M+N)/L) of a total of the content amount (M) of the dicyanate compound and the content amount (N) of the bismaleimide compound to the content amount (L) of the epoxy compound having the isocyanuric acid ring is in a range of 0.65 to 4.00.

2. The sliding member according to claim 1, wherein the sliding member is a sliding bearing.

3. The sliding member according to claim 2, wherein the sliding bearing is a spherical bearing.

4. The sliding member according to claim 1, wherein the sliding member includes a head portion, a shaft portion, and a thread portion, and the self-lubricating liner is formed on an outer circumferential surface of the shaft portion.

5. The sliding member according to claim 1, wherein the solid lubricant contains polytetrafluoroethylene resin.

6. The sliding member according to claim 1, wherein the thermosetting resin composition contains the dicyanate compound;

the total content amount (L+M) of the content amount (L) of the epoxy compound having the isocyanuric acid ring and the content amount (M) of the dicyanate compound is in the range of 20% by weight to 90% by weight;

the weight ratio (M/L) of the content amount (M) of the dicyanate compound to the content amount (L) of the epoxy compound having the isocyanuric acid ring is in the range of (M/L)=0.65 to 4.00.

7. The sliding member according to claim 1, wherein the thermosetting resin composition contains the dicyanate compound and the bismaleimide compound;

the total content amount (L+M+N) of the content amount (L) of the epoxy compound having the isocyanuric acid ring, the content amount (M) of the dicyanate compound, and the content amount (N) of the bismaleimide compound is in the range of 20% by weight to 90% by weight; and the weight ratio ((M+N)/L) of the total of the content amount (M) of the dicyanate compound and the content amount (N) of the bismaleimide compound to the content amount (L) of the epoxy compound having the isocyanuric acid ring is in the range of ((M+N)/L)=0.65 to 4.00.

8. The sliding member according to claim 1, wherein the epoxy compound having the isocyanuric acid ring contains an epoxy compound in which all of the X, Y and Z in the formula (1) are each the group containing the epoxy ring, an epoxy compound in which two of the X, Y and Z in the formula (1) are each the group containing the epoxy ring, and an epoxy compound in which one of the X, Y and Z in the formula (1) is the group containing the epoxy ring.

9. The sliding member according to claim 1, wherein the epoxy compound having the isocyanuric acid ring contains one or both of:
1,3,5-tris(2,3-epoxypropyl)-1,3,5-triazine-2,4,6(1H, 3H, 5H)-trione; and
an addition reaction product of the 1,3,5-tris(2,3-epoxypropyl)-1,3,5-triazine-2,4,6(1H, 3H, 5H)-trione and propionic acid anhydride.

10. The sliding member according to claim 8, wherein the epoxy compound having the isocyanuric acid ring contains:
1,3,5-tris(2,3-epoxypropyl)-1,3,5-triazine-2,4,6(1H, 3H, 5H)-trione; and
an addition reaction product of the 1,3,5-tris(2,3-epoxypropyl)-1,3,5-triazine-2,4,6(1H, 3H, 5H)-trione and propionic acid anhydride.

11. The sliding member according to claim 1, wherein the dicyanate compound is an aromatic dicyanate compound.

12. The sliding member according to claim 11, wherein the dicyanate compound is a compound represented by the following formula (6):

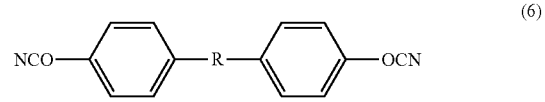

(6)

in the formula (6), R is a substituted or unsubstituted alkylene group.

13. The sliding member according to claim 12, wherein the dicyanate compound is 2,2-bis(4-cyanatophenyl)propane.

14. The sliding member according to claim 7, wherein the thermosetting resin composition contains the dicyanate compound and the bismaleimide compound; and
the dicyanate compound and the bismaleimide compound react with each other to form a bismaleimide triazine resin.

15. The sliding member according to claim 7, wherein the thermosetting resin composition contains the dicyanate compound and the bismaleimide compound; and
the bismaleimide compound is an aromatic bismaleimide compound.

16. The sliding member according to claim 15, wherein the bismaleimide compound is 4,4-bismaleimide diphenylmethane.

17. The sliding member according to claim 1, further comprising a thermoplastic resin.

18. The sliding member according to claim 17, wherein the thermoplastic resin is polyether ether ketone.

* * * * *